(12) United States Patent
Pang et al.

(10) Patent No.: US 11,140,644 B2
(45) Date of Patent: Oct. 5, 2021

(54) METHOD FOR SENDING SYNC BEACON MESSAGE BY NAN DEVICE, AND DEVICE

(71) Applicant: HUAWEI TECHNOLOGIES CO., LTD., Guangdong (CN)

(72) Inventors: Gaokun Pang, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 16/088,951

(22) PCT Filed: Mar. 28, 2016

(86) PCT No.: PCT/CN2016/077566
§ 371 (c)(1),
(2) Date: Sep. 27, 2018

(87) PCT Pub. No.: WO2017/166032
PCT Pub. Date: Oct. 5, 2017

(65) Prior Publication Data
US 2019/0124611 A1    Apr. 25, 2019

(51) Int. Cl.
*H04W 4/00*  (2018.01)
*H04W 56/00*  (2009.01)
(Continued)

(52) U.S. Cl.
CPC ....... *H04W 56/0015* (2013.01); *H04W 56/00* (2013.01); *H04W 74/00* (2013.01); *H04W 84/18* (2013.01)

(58) Field of Classification Search
CPC .................................................. H04W 56/0015
See application file for complete search history.

(56) References Cited

U.S. PATENT DOCUMENTS

2015/0200811 A1* 7/2015 Kasslin ............... H04L 41/0853
370/254
2016/0278086 A1    9/2016 Du et al.
(Continued)

FOREIGN PATENT DOCUMENTS

CN    104053227 A    9/2014
CN    104349285 A    2/2015
(Continued)

OTHER PUBLICATIONS

Wi-Fi Alliance® Technical Task Group, Wi-Fi Neighbor Awareness Networking (NAN), Wi-Fi NAN Technical Specification Contribution, Version 0.0 (TG Baseline r23). Jan. 2016. 99 pages.
(Continued)

*Primary Examiner* — Samina F Choudhry
(74) *Attorney, Agent, or Firm* — Conley Rose, P.C.

(57) ABSTRACT

Embodiments of the present invention relate to the communications field, and provide a method for sending a sync beacon message by a NAN device, and a device, so as to resolve a problem of a sync beacon message conflict that occurs when the NAN device merges to a new cluster in a master role. The method is: when a first device in a first cluster receives first cluster information of a second cluster, if the first device determines to merge to the second cluster, sending a sync beacon message in the second cluster according to a role and a state of the first device in the first cluster. According to the embodiments of the present invention, after merging to a cluster, a NAN device determines whether to send a sync beacon frame.

20 Claims, 11 Drawing Sheets

(51) Int. Cl.
*H04W 74/00* (2009.01)
*H04W 84/18* (2009.01)

(56) References Cited

U.S. PATENT DOCUMENTS

| | | |
|---|---|---|
| 2016/0309404 A1 | 10/2016 | Kasslin et al. |
| 2016/0353368 A1 | 12/2016 | Fang et al. |
| 2017/0019869 A1 | 1/2017 | Kim et al. |
| 2017/0223704 A1 | 8/2017 | Du et al. |
| 2018/0234934 A1 | 8/2018 | Pang et al. |

FOREIGN PATENT DOCUMENTS

| | | |
|---|---|---|
| CN | 104378800 A | 2/2015 |
| CN | 104780510 A | 7/2015 |
| EP | 2835915 A2 | 2/2015 |
| WO | 2015021780 A1 | 2/2015 |
| WO | WO 2015/021780 * | 2/2015 |
| WO | 2015119440 A1 | 8/2015 |

OTHER PUBLICATIONS

Wi-Fi Neighbor Awareness Networking (NAN) Technical SpecificationVersion 1.0, Mar. 13, 2015. 98 pages.
NAN Datapath Synchronization, Apple, Jul. 2015. 8 pages.
Machine Translation and Abstract of Chinese Publication No. CN104378800, Feb. 25, 2015, 31 pages.
Foreign Communication From a Counterpart Application, Chinese Application No. 201680080776.6, Chinese Office Action dated Dec. 4, 2019, 6 pages.

\* cited by examiner

A first device that is on a NAN and that is located in a first cluster receives a message, where the message includes first cluster information of a second cluster / 301

When merging to the second cluster, the first device sends a sync beacon message in the second cluster according to a role and a state of the first device in the first cluster / 302

METHOD FOR SENDING SYNC BEACON MESSAGE BY NAN DEVICE, AND DEVICE

CROSS-REFERENCE TO RELATED APPLICATIONS

This application is a national stage of International Application No. PCT/CN2016/077566, filed on Mar. 28, 2016, which is hereby incorporated by reference in its entirety.

TECHNICAL FIELD

The present invention relates to the communications field, and in particular, to a method for sending a sync beacon message by a NAN device, and a device.

BACKGROUND

A basic standard of a wireless broadband (WIreless-Fidelity, Wi-Fi) technology is an 802.11 protocol formulated by the Institute of Electrical and Electronics Engineers (Institute of Electrical and Electronics Engineers, IEEE). A central node, that is, an access point (Access Point, AP), and at least one station (Station, STA) are included. The STA exchanges a message with the AP to join a network served by the AP. A network structure and data transmission in the 802.11 protocol impose a restriction on mobility, and it is relatively difficult to perform service discovery for a node not connected to the AP. Therefore, related standardization organizations formulate new standards based on the 802.11 protocol, to achieve a service discovery effect without requiring association. A neighbor awareness network (Neighbor Awareness Network, NAN) is one mechanism.

By means of the NAN mechanism, all devices participating in the NAN mechanism are synchronized when there is no central node. NAN mechanism maintenance work and service discovery work are performed in a discovery window (discovery window, DW) specified in the NAN mechanism. After service discovery is performed, a corresponding connection may be established between the devices based on information obtained in the service discovery, to form a cluster (Cluster), thereby performing data transmission. The devices in the NAN mechanism include two roles (Role): a master device (master) and a non-master device (non-master). The master includes an anchor master device (anchor master, AM) and a non-anchor master, and states (State) of both are a sync (sync) state by default. The non-master has two states: non-master sync and non-master non-sync. Each device may constantly change between three states: master, non-master sync, and non-master non-sync, and stay in one state.

When all the devices in the NAN mechanism wake up in the DW, a device that is in a master role and that is in a non-master sync state sends a sync beacon (sync beacon) message. The message carries information about an AM, including an anchor master rank (anchor master rank, AMR), an anchor master beacon transmission time (anchor master beacon transmission time, AMBTT), a time synchronization function (time synchronization function, TSF), a cluster identifier (Cluster ID), and a master rank (master rank, MR) or the like that is of the device. The message is used to synchronize another NAN device in a cluster with an AM in the cluster, that is, to set related information of the device according to a received sync beacon.

In a prior-art NAN specification, when a NAN device A in a cluster 1 receives a sync beacon message sent by a device B in another cluster 2, if a cluster grade (Cluster grade, CG) value that is of the cluster 2 and that is obtained by the NAN device A according to the beacon message is greater than a CG value of the cluster 1, the NAN device A leaves the cluster 1, merges (merge) to the cluster 2 in a master role, sends a sync beacon message in a DW of the cluster 1 in a process in which the NAN device A merges to the cluster 2. The sync beacon message carries information of the cluster 2 for spreading, so that a device that is in the cluster 1 and that senses a sync beacon also merges to the cluster 2 in a master role. As stated in the prior art, a backoff window of a master is [0, 15]. Therefore, sync beacon messages sent by masters that merge to the cluster 2 easily conflict with each other. Consequently, another NAN device in the cluster 2 may not receive a sync beacon, resulting in a waste of air interface resources.

SUMMARY

Embodiments of the present invention provide a method for sending a sync beacon message by a NAN device, and a device, so as to resolve a problem of a sync beacon message conflict that occurs when the NAN device merges to a new cluster in a master role.

According to a first aspect, a method for sending a sync beacon message by a NAN device is provided, including:

receiving, by a first device that is on a NAN and that is located in a first cluster, a message, where the message includes first cluster information of a second cluster; and when merging to the second cluster, sending, by the first device, a sync beacon message in the second cluster according to a role and a state of the first device in the first cluster.

The first device herein may receive a message sent by a second device that is in the second cluster, where the message includes the first cluster information of the second cluster; or receive a message sent by a third device that is in the first cluster, where the third device is located in a first NAN data cluster NDC of the first cluster, and the message includes the first cluster information of the second cluster; or receive a message sent by a fourth device that is in the first cluster, where the message includes the first cluster information of the second cluster.

The first cluster information may include at least one of a cluster identifier of the second cluster, a first anchor master rank AMR, a first anchor master beacon transmission time AMBTT, a first time synchronization function TSF, or a first hop count HC.

Therefore, in this application, when the first device merges to the second cluster, unlike the prior art in which the first device merges to the second cluster in a master role and sends a sync beacon message in the second cluster, whether to send the sync beacon message is determined according to the role and the state of the first device in the first cluster. Backoff intervals in different roles and states are different, or the sync beacon message is not sent in a specific role and state, thereby avoiding the problem of the sync beacon conflict that occurs when multiple devices merge to the second cluster.

In a possible design, the sending a sync beacon message in the second cluster according to a role and a state of the first device in the first cluster includes:

if the role and the state of the first device in the first cluster is a master device or a non-master device, and the state is a sync state, sending, by the first device, the sync beacon message in the second cluster.

In a possible design, before the sending, by the first device, the sync beacon message, the method further includes:

setting, by the first device, information of the first device according to the first cluster information.

Therefore, when determining to merge to the second cluster, the first device can set the information of the first device according to the received first cluster information of the second cluster, so that the first device is enabled to interconnect and intercommunicate with a device in the second cluster in a timely manner when merging to the second cluster.

In a possible design, the setting, by the first device, information of the first device according to the first cluster information includes: setting, by the first device, at least one of a cluster identifier of the first device, anchor master information, a second TSF, or a role and a state of the first device. The cluster identifier of the first device is the cluster identifier of the second cluster. The anchor master information includes at least one of a second AMR, a second AMBTT, or a second HC, where a value of the second AMR is the same as a value of the first AMR, a value of the second AMBTT is the same as a value of the first AMBTT, and a value of the second HC is a value of the first HC plus 1. The second TSF is the same as the first TSF. The role of the first device is a master device, and the state is a sync state by default; or the role and the state of the first device are the same as the role and the state of the first device in the first cluster; or a role and state after setting of the first device are determined by comparing at least one item of information before setting of the first device and at least one item of the first cluster information, where the information includes an auxiliary master rank MR before setting of the first device, an HC before setting, and an AMBTT before setting.

Therefore, when the first device sets the information of the first device after determining to merge to the second cluster, an HC that represents a quantity of hops needs to be increased by 1. Also unlike the prior art in which the first device directly merges to the second cluster in a master role, the role and the state of the first device may be set to a master, or the role and the state of the first device may be set to be the same as the role and the state of the first device in the first cluster, and other information is consistent with corresponding information in the received first cluster information of the second cluster, so that the first device is enabled to interconnect and intercommunicate with the device in the second cluster in a timely manner.

In a possible design, before the setting, by the first device, information of the first device, the method further includes: if the first device receives the message from the second device, obtaining, by the first device, an MR of the second device; if the first device receives the message from the third device, obtaining, by the first device, an MR of the third device; or if the first device receives the message from the fourth device, obtaining, by the first device, an MR of the fourth device.

In a possible design, the determining, according to a role and a state of the first device in the first cluster, whether to send a sync beacon message in the second cluster includes: when the role and the state of the first device are set to be the same as the role and the state of the first device in the first cluster, and if the role after setting is the master device or a non-master device, and the state after setting is the sync state, determining, by the first device, to send the sync beacon message in the second cluster; or if the role after setting is a non-master device, and the state after setting is a non-sync state, determining, by the first device, not to send the sync beacon message in the second cluster.

The sync beacon message carries at least one item of information after setting of the first device. Therefore, when the first device merges to the second cluster, if the role after setting is the non-master device and the state after setting is the non-sync state, the sync beacon message does not need to be sent. This avoids a sync beacon message conflict, and may further save an air interface resource.

In a possible design, the method further includes: when the role of the first device is set to the master device, recording, by the first device, the role and the state of the first device in the first cluster. The determining, according to a role and a state of the first device in the first cluster, whether to send a sync beacon message in the second cluster includes: if the role of the first device in the first cluster is the master device or a non-master device, and the state is the sync state, determining, by the first device, to send the sync beacon message; or if the role of the first device in the first cluster is a non-master device, and the state is a non-sync state, determining, by the first device, not to send the sync beacon message in the second cluster.

That is, when merging to the second cluster, the first device merges to the second cluster in a master role, but determines, according to the role and the state of the first device in the first cluster before merging to the second cluster, whether to send the sync beacon message in the second cluster. The role and the state of the first device in the first cluster are not necessarily the master, a backoff interval of the master role is [0, 15], a backoff interval of a device that is in the non-master role and that is in the sync state is [0, 31], and a device that is the non-master role and that is in the non-sync state does not send the sync beacon message. Therefore, a conflict between sync beacon messages sent by devices merging to the second cluster can be avoided.

In a possible design, the sync beacon message may be sent in the second cluster after a backoff interval is modified. This may specifically include: when the role of the first device is set to the master device, modifying, by the first device, a backoff interval, where a modified backoff interval is greater than the backoff interval before the modification; and sending, by the first device, the sync beacon message in the second cluster according to the modified backoff interval.

Therefore, if the first device is set to be in the master role when merging to the second cluster, the first device sends the sync beacon message in the second cluster, but the first device may modify the backoff interval before sending the sync beacon message, so that the modified backoff interval is greater than the backoff interval before the modification. In this way, a probability that backoff values randomly selected by devices merging to the second cluster may be the same is reduced, thereby avoiding a conflict between sync beacon frames that are sent.

In a possible design, when the role and the state of the first device are determined by comparing the at least one item of the information before setting of the first device and the at least one item of the second cluster information, if the role after setting is the master device or a non-master device, and the state after setting is the sync state, determining, by the first device, to send the sync beacon message in the second cluster; or if the role after setting is a non-master device, and the state after setting is a non-sync state, determining, by the first device, not to send the sync beacon message in the second cluster.

For example, a role before setting of the first device is the master, and the MR is less than an MR in the second cluster information. Then, the role after setting of the first device is the non-master, the state after setting is the sync state, and after merging to the second cluster, the first device determines to send the sync beacon frame. For another example, a role before setting of the first device is the non-master, a state before setting is the sync state, and a value of the HC is less than a value of an HC in the second cluster. Then, the role after setting of the first device is the non-master, the state after setting is the non-sync state, and after merging to the second cluster, the first device does not send the sync beacon frame. This may avoid a sync conflict problem, and may further save an air interface resource.

In a possible design, the method further includes: if the first device receives the first cluster information sent by the second device, and the first device is located in at least one NDC, determining, by the first device, to send, in the at least one NDC, second cluster information of the second cluster, where the second cluster information includes at least one item of information after setting of the first device.

Therefore, if the first device receives the first cluster information from the second device in the second cluster, if the first device is located in the at least one NDC in the first cluster, the first device also sends information of the second cluster in the at least one NDC, so that a device that is in the at least one NDC and that obtains the information of the second cluster through listening also connects to the second cluster. In this way, after the first device spreads the cluster information of the second cluster in the NDC in the first cluster, a spreading scope of the cluster information of the second cluster is enlarged, and faster spreading of the cluster information may be implemented by using the NDC.

In a possible design, the method further includes: if the first device has received the second cluster information sent by any other device in the first cluster, canceling, by the first device, sending of the second cluster information in the at least one NDC.

Therefore, the second cluster information may be prevented from being repeatedly sent in the at least one NDC, thereby reducing air interface overheads.

In a possible design, the method further includes: if the first device receives the message from the third device, determining, by the first device, to send, in another NDC except the first NDC among all NDCs in which the first device is located, second cluster information of the second cluster, where the second cluster information includes at least one item of information after setting of the first device.

The third device is a device in any NDC in the first cluster. Therefore, when the first device receives the message sent by the third device, information of the second cluster may be sent in another NDC in which the first device is located, a spreading scope of the cluster information of the second cluster is enlarged, and faster spreading of the cluster information may be implemented by using the NDC.

In a possible design, the method further includes: if the first device has received the second cluster information from any one of the remaining NDCs, canceling, by the first device, sending of the second cluster information in the remaining NDCs.

Therefore, the information of the second cluster may be prevented from being repeatedly sent in the first cluster, thereby reducing air interface overheads.

In a possible design, the method further includes: updating, by the first device, at least one of an NDC management window, NDC data link NDL information, a group key, or a device identifier of the first device.

Therefore, after merging to the second cluster, the first device may interconnect and intercommunicate with a device in the second cluster according to updated information.

According to a second aspect, a first device is provided, where the first device is located on a neighbor awareness network NAN, and includes:

a receiving unit, configured to receive a message, where the message includes first cluster information of a second cluster; and a first determining unit, configured to: when the first device merges to the second cluster, send a sync beacon message in the second cluster according to a role and a state of the first device in a first cluster.

In a possible design, the first determining unit is configured to: if the role and the state of the first device in the first cluster is a master device or a non-master device, and the state is a sync state, send, by the first device, the sync beacon message in the second cluster.

In a possible design, the first device further includes:

a setting unit, configured to: before the first device sends the sync beacon message, set information of the first device according to the first cluster information.

In a possible design, the first cluster information includes at least one of a cluster identifier of the second cluster, a first anchor master rank AMR, a first anchor master beacon transmission time AMBTT, a first time synchronization function TSF, or a first hop count HC.

In a possible design, the setting unit is configured to:

set at least one of a cluster identifier of the first device, anchor master information, a second TSF, or a role and a state of the first device, where the cluster identifier of the first device is the cluster identifier of the second cluster;

the anchor master information includes at least one of a second AMR, a second AMBTT, or a second HC, where a value of the second AMR is the same as a value of the first AMR, a value of the second AMBTT is the same as a value of the first AMBTT, and a value of the second HC is a value of the first HC plus 1;

the second TSF is the same as the first TSF; and the role of the first device is a master device, and the state is a sync state by default; or the role and the state of the first device are the same as the role and the state of the first device in the first cluster; or a role and state after setting of the first device are determined by comparing at least one item of information before setting of the first device and at least one item of the first cluster information, where the information before setting includes an auxiliary master rank MR before setting of the first device, an HC before setting, and an AMBTT before setting.

In a possible design, the receiving unit is configured to receive a message sent by a second device that is in the second cluster, where the message includes the first cluster information of the second cluster; or receive a message sent by a third device that is in the first cluster, where the third device is located in a first NAN data cluster NDC of the first cluster, and the message includes the first cluster information of the second cluster; or receive a message sent by a fourth device that is in the first cluster, where the message includes the first cluster information of the second cluster.

In a possible design, before the information of the first device is set, the first device further includes an obtaining unit, configured to:

if the first device receives the message from the second device, obtain an MR of the second device;

if the first device receives the message from the third device, obtain an MR of the third device; or if the first device receives the message from the fourth device, obtain an MR of the fourth device.

In a possible design, the first determining unit is configured to:

when the role and the state of the first device are set to be the same as the role and the state of the first device in the first cluster, and if the role after setting is the master device or a non-master device, and the state after setting is the sync state, determine to send the sync beacon message in the second cluster; or if the role after setting is a non-master device, and the state after setting is a non-sync state, determine not to send the sync beacon message in the second cluster.

In a possible design, the first device further includes:

a recording unit, configured to: when the role of the first device is set to the master device, record the role and the state of the first device in the first cluster, where the first determining unit is configured to:

if the role of the first device in the first cluster is the master device or a non-master device, and the state is the sync state, determine to send the sync beacon message; or if the role of the first device in the first cluster is a non-master device, and the state is a non-sync state, determine not to send the sync beacon message in the second cluster.

In a possible design, the first determining unit is configured to: when the role of the first device is set to the master device, determine to send the sync beacon message in the second cluster; and the setting unit is further configured to modify a backoff interval, where a modified backoff interval is greater than the backoff interval before the modification.

In a possible design, the first determining unit is configured to:

when the role and the state of the first device are determined by comparing the at least one item of the information before setting of the first device and the at least one item of the second cluster information, if the role after setting is the master device or a non-master device, and the state is the sync state, determine to send the sync beacon message in the second cluster; or if the role after setting is a non-master device, and the state after setting is a non-sync state, determine not to send the sync beacon message in the second cluster.

In a possible design, the first device further includes a second determining unit, configured to:

if the first device receives the first cluster information sent by the second device, and the first device is located in at least one NDC, determine, by the first device, to send, in the at least one NDC, second cluster information of the second cluster, where the second cluster information includes at least one item of information after setting of the first device.

In a possible design, the first device further includes:

a first cancellation unit, configured to: if the first device has received the second cluster information sent by any other device in the first cluster, cancel sending of the second cluster information in the at least one NDC.

In a possible design, the first cancellation unit is configured to:

compare information that is carried in the second cluster information sent by the any device and the information after setting of the first device; and if the first AMBTT is less than a fourth AMBTT carried in the second cluster information, or the first HC is greater than a fourth HC carried in the second cluster information, or the first AMR is less than a fourth AMR carried in the second cluster information, or the device rank MR of the first device is less than an MR of the any device, cancel sending of the second cluster information in the at least one NDC.

In a possible design, the first device further includes a third determining unit, configured to:

if the first device receives the message from the third device, determine to send, in another NDC except the first NDC among all NDCs in which the first device is located, second cluster information of the second cluster, where the second cluster information includes at least one item of information after setting of the first device.

In a possible design, the first device further includes:

a second cancellation unit, configured to: if the first device has received the second cluster information from any one of the remaining NDCs, cancel sending of the second cluster information in the remaining NDCs.

In a possible design, the first device further includes a fourth determining unit, configured to:

if the first device receives the message from the fourth device, determine to send second cluster information of the second cluster in the first cluster, where the second cluster information includes at least one item of information after setting of the first device.

In a possible design, the first device further includes a third cancellation unit, configured to:

if the first device has received the second cluster information sent by any device in the first cluster, cancel sending of the second cluster information in the first cluster.

In a possible design, the setting unit is further configured to:

update at least one of an NDC management window, NDC data link NDL information, a group key, or a device identifier of the first device.

According to another aspect, a first device is provided, where the first device has a function for implementing actions of the first device in the foregoing method designs. The function may be implemented by using hardware or by using hardware executing corresponding software. The hardware or software includes one or more modules corresponding to the foregoing function.

In a possible design, the first device includes a processor and a network interface. The processor is configured to support the first device in performing a corresponding function in the foregoing method. The network interface is configured to support the first device in sending and receiving a message. For example, the network interface is configured to receive a message, where the message includes first cluster information of a second cluster; and the processor is configured to: when determining to merge to the second cluster, set information of the first device according to the first cluster information. The first device may further include a memory. The memory is coupled to the processor and is configured to store a necessary program instruction and data of the first device.

In comparison with the prior art, according to the method provided in the present invention, when the first device receives the first cluster information of the second cluster, whether to send the sync beacon message in the second cluster can be determined according to the role and the state of the first device in the first cluster. This may avoid a problem of a sync beacon conflict generated when devices all merge to the second cluster in the master role and send a sync beacon message. For example, when the role of the first device in the first cluster is non-master, and the state is non-sync, the first device does not need to send a sync beacon message. This may avoid a sync beacon conflict, and may further save an air interface resource.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
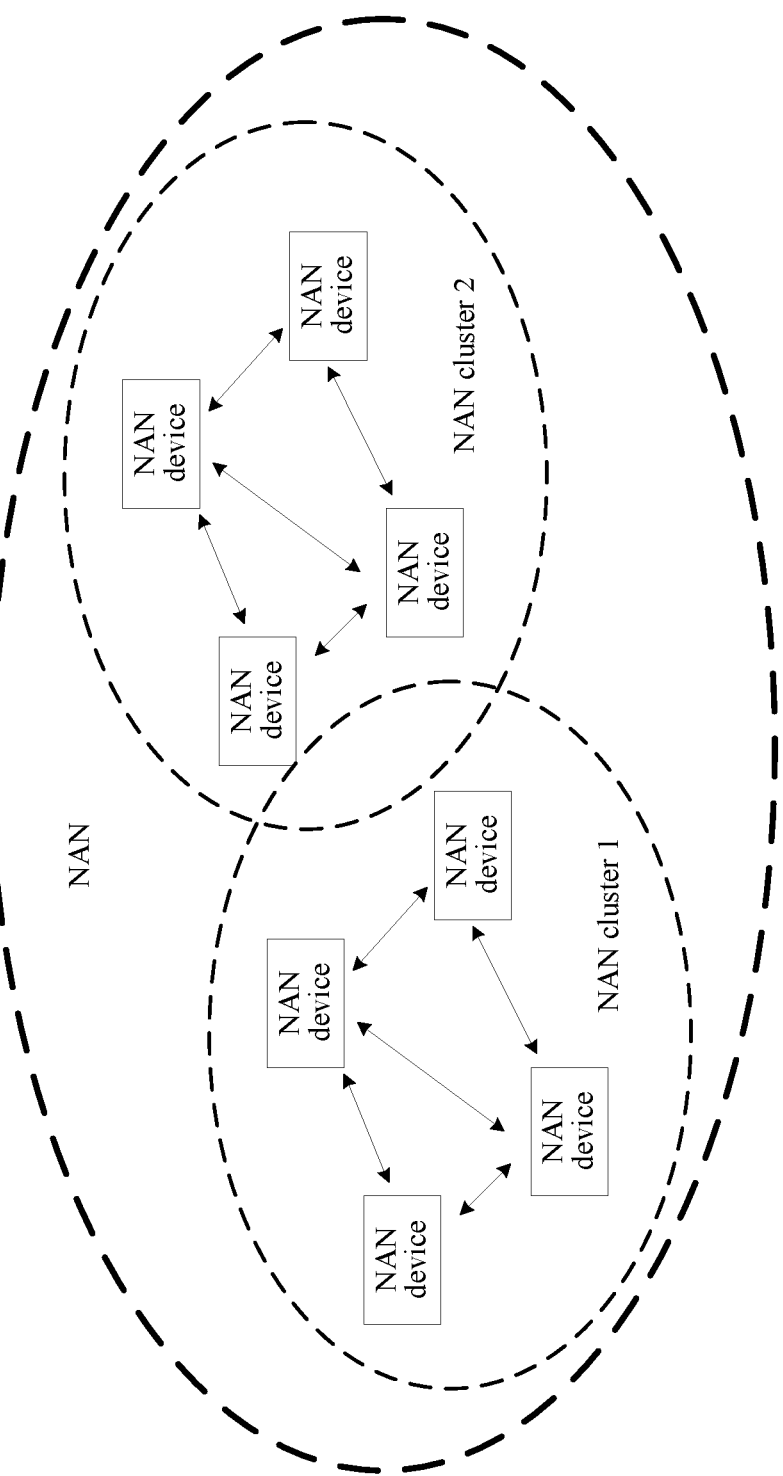
FIG. 1 is a schematic diagram of a NAN network architecture that includes two clusters according to an embodiment of the present invention.
Figures 2, 3:
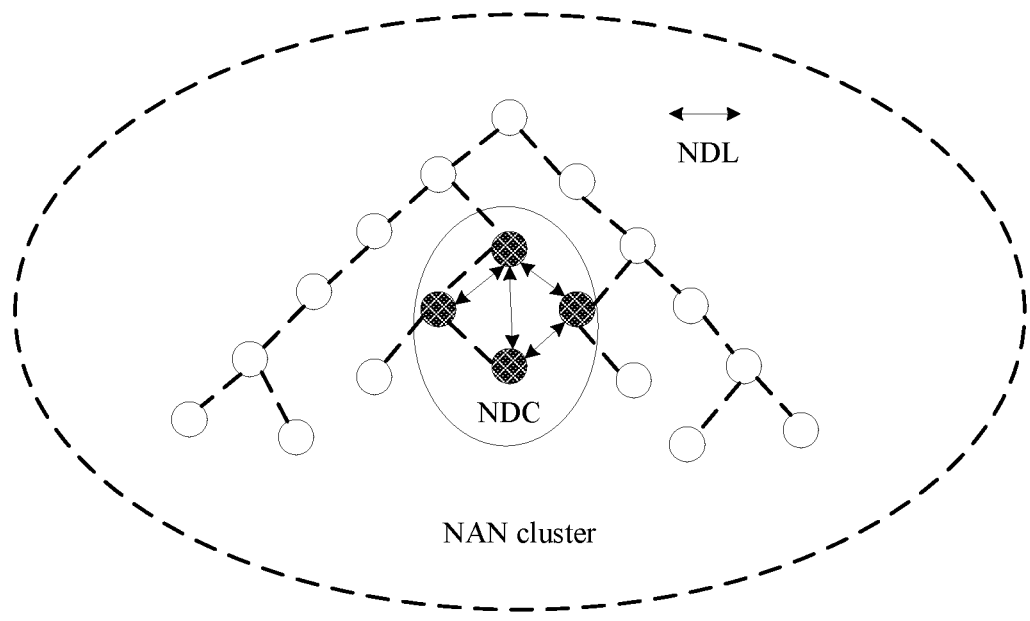
FIG. 2 is a schematic connection diagram of an NDC in a same cluster according to an embodiment of the present invention.
FIG. 3 is a schematic flowchart of a method for sending a sync beacon message according to an embodiment of the present invention.

The embodiments of the present invention apply to a NAN. The NAN may include multiple clusters, and coverage areas of the clusters may have an overlapping region. FIG. 1 is a schematic diagram of a NAN network architecture that includes two clusters. A NAN cluster 1 and a NAN cluster 2 shown in FIG. 1 each includes multiple NAN devices and/or NAN2.0 devices. Synchronization, maintenance work, and service discovery work may be performed between the NAN devices. A cluster may include multiple NAN data clusters (NAN Data Cluster, NDC) (which may also be referred to as a data group or another name). Each NDC may be construed as a group (group) including NAN2.0 devices, and is a group established for transmitting data between at least two NAN2.0 devices. That is, a NAN2.0 device may establish a NAN data link (NAN Data Link, NDL) to another NAN2.0 device in an NDC in which the NAN2.0 device is located, and multiple NDLs may be established between NAN2.0 devices in each NDC. As shown in FIG. 2, FIG. 2 is a schematic connection diagram of an NDC in a same cluster. A NAN device or a NAN2.0 device may be a communications terminal such as a mobile phone or a tablet. For example, multiple mobile phones may perform data transmission to play an online game at the same time.

The synchronization between NAN devices may be time synchronization. The service discovery work may enable a NAN device to establish a corresponding connection based on information obtained in service discovery, so as to perform data transmission. NAN devices may be classified into a master and a non-master. A state of the master may be an anchor master (AM) or a non-anchor master (which is also referred to as a master for short), which are both in a sync state by default. A state of the non-master may be non-master sync or non-master non-sync. The maintenance work may enable each NAN device to have an equal opportunity of constantly changing between the four states and staying in one state. Specifically, one DW may be set at an interval of 512 TUs, and duration lasts for 16 TUs. One TU (time unit) is approximately 1024 ms. NAN devices in anchor master, master, and non-master sync states send a sync beacon message by means of contention by using a backoff mechanism. The message carries information of the AM. After sensing the message, another device sets related information of the another device to keep synchronized with the AM.

An NDC includes a Base Schedule (base schedule). In the Base Schedule, a NAN device wakes up, and may receive a message sent by another NAN device or send a message to another NAN device. The Base Schedule is equivalent to a management window of the NDC, so that data communication is performed between NAN devices in the NDC.

In the prior art, when merging from a cluster 1 to a cluster 2, a NAN device merges in a master role. The NAN device sends information of the cluster 2 in the cluster 1 in a merging process, so that a NAN that is in the cluster 1 and that obtains the information through listening also merges to the cluster 2 in the master role. Therefore, there are multiple NAN devices in the master role sending sync beacon messages in the cluster 2. Further, a backoff interval for the master role to send the sync beacon message is [0, 15], and a sync beacon conflict is prone to occur. Therefore, to resolve the problem, in the present invention, when determining to merge to the cluster 2, the NAN device may determine, according to a role and a state of the NAN device in the cluster 1, whether to send the sync beacon message in the cluster 2, thereby avoiding the problem of the sync beacon conflict. Therefore, an embodiment of the present invention provides a method for sending a sync beacon message by a NAN device. As shown in FIG. 3, the method includes the following steps.

301. A first device that is on a NAN and that is located in a first cluster receives a message, where the message includes first cluster information of a second cluster.

The first cluster is a cluster prior to the second cluster in which the first device is located, or a cluster in which the first device is located before merging to the second cluster.

The first device that is on the NAN and that is located in the first cluster (denoted as a cluster 1) may receive a message sent by a second device that is in the second cluster (denoted as a cluster 2). The message includes the first cluster information of the second cluster. The message may be specifically a sync beacon (sync beacon) frame in a DW, or may be a discovery beacon (discovery beacon) frame outside the DW.

Alternatively, the first device receives a message sent by a third device that is in the first cluster, where the third device is located in a first NDC of the first cluster, and the message includes the first cluster information of the second cluster. The message may be specifically an announcement message (announcement frame).

Alternatively, the first device receives a message sent by a fourth device that is in the first cluster. The message may be a sync beacon message in a DW, or may be a discovery beacon message outside the DW. The message includes the first cluster information of the second cluster. The fourth device may be in an NDC of the first cluster, or may not be in an NDC of the first cluster. The message may be spread in the first cluster in a broadcast manner.

The first device is denoted as a NAN device A, and the second device is denoted as a NAN device B. The first cluster information is information of the cluster 2, and includes at least one of the following: a Cluster ID (cluster identifier), an AMR, a TSF, an AMBTT, an HC, or the like. The Cluster ID is an ID of the cluster 2, the AMR is a value of an MR of an AM in the cluster 2, the AMBTT is a value of an AMBTT of the AM in the cluster 2, the HC is an HC value for the NAN device B to reach the AM in the cluster 2, and the TSF is a value of a TSF in the message received by the NAN device A. The TSF value is obtained according to a time stamp (time stamp) in the message. Generally, the TSF value may be replaced by the TSF. The first device may further obtain a CG value of the cluster 2 according to the information of the cluster 2. A rule for calculating the CG value is: $CG=2^{64}*A1+A2$, where A1 is a value of a master preference (Master Preference, MP) of the AM in the cluster 2 and is denoted as an AMP, the AMP represents a value of a preference of an anchor master device to function as a master device, and A2 is the value of the TSF.

A CG is cluster grade information. An AMR is an MR value of an AM, the MR value represents a preference of a NAN device to function as a master, and a higher MR value represents a higher preference. A TSF represents a synchronization function of the NAN device, so that a timer of the NAN device is the same as a time of the AM. An AMBTT represents a time of sending a beacon of the AM. An HC value represents a quantity of hops from the NAN device to the AM.

When the NAN device A in the cluster 1 receives the information of the cluster 2, the NAN device A determines whether the Cluster ID in the information of the cluster 2 is the same as a Cluster ID of the cluster 1, and determines whether the CG value in the information of the cluster 2 is greater than a CG value of the cluster 1 in which the NAN device A is located. If the Cluster IDs are different, and the CG value in the information of the cluster 2 is greater than the CG value of the cluster 1, the NAN device determines to merge to the cluster 2; otherwise, the NAN device A discards the received message.

302. When merging to the second cluster, the first device sends a sync beacon message in the second cluster according to a role and a state of the first device in the first cluster.

For example, when determining to merge to the cluster 2, the NAN device A may determine, according to the role and the state of the NAN device A in the cluster 1, whether to send the sync beacon message in the cluster 2. For example, when the role of the NAN device A in the cluster 1 is a master, or when the role is a non-master and the state is sync, when merging to the cluster 2, the NAN device A determines to send the sync beacon message; or when the role of the NAN device A in the cluster 1 is a non-master, and the state is non-sync, when merging to the cluster 2, the NNA device A determines not to send the sync beacon message.

Alternatively, in a prior-art specification, a backoff interval for a NAN device in a master role to send the sync beacon message is [0, 15]. Therefore, when the NAN device A merges to the cluster 2 in the master role, the backoff interval may be modified, so that a modified backoff interval is greater than the backoff interval [0, 15] before the modification. For example, the modified backoff interval is [0, 50] or another interval, so that a probability that backoff values selected by NAN devices are the same is reduced, thereby avoiding a sync beacon conflict.

Figure 4:
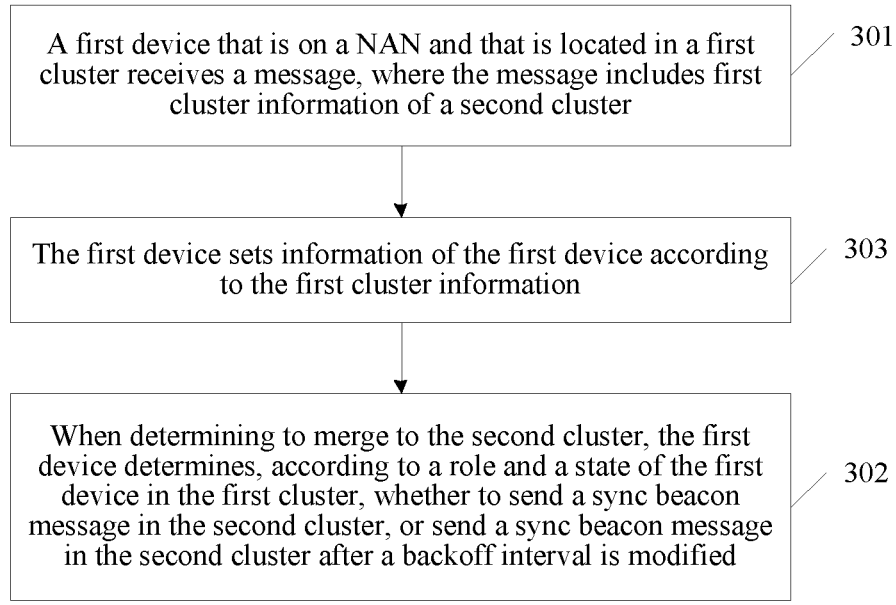
FIG. 4 is a schematic flowchart of a method for sending a sync beacon message according to an embodiment of the present invention.

In the prior art, a NAN specification does not specify how a NAN device sets information of the NAN device when merging from the cluster 1 to the cluster 2. As a result, there is no unified standard for NAN devices of various vendors during implementation. When information of different NAN devices is different, the NAN devices cannot synchronize with the AM in the cluster 2 in a timely manner when merging to the cluster 2, so that interconnection and intercommunication between the NAN devices cannot be implemented. Therefore, before a NAN device sends a sync beacon message when merging to the cluster 2, the NAN device may further set information of the NAN device according to the received information of the cluster 2, so as to interconnect and intercommunicate with a device in the cluster 2 in a timely manner. Therefore, as shown in FIG. 4, before the first device sends the sync beacon message, the method further includes the following step:

303. The first device sets information of the first device according to the first cluster information.

The information of the first device may be set when the first device determines to merge to the second cluster, or when the first device prepares to merge to the second cluster after determining, or after the first device merges to the second cluster. This application sets no limitation thereto.

When setting the information of the first device, that is, the NAN device A, the first device may set at least one of anchor master information (current anchor master record) of the first device, the TSF, or a role, a state, and a cluster identifier of the first device according to the first cluster information of the cluster 2, and may further include last anchor master information (last anchor master record). The anchor master information may also be information (including at least one of a second AMR, a second AMBTT, or a second HC) carried and sent in a sync beacon, or may be information (including at least one of a second AMR, a second AMBTT, or a second HC) carried and sent in an announcement frame.

The current anchor master record includes at least one of a first AMR, a first AMBTT, or a first HC. A value of the first AMR is set to the value of the MR (the second AMR) of the AM in the cluster 2 obtained in step 301, that is, the value of the first AMR is the same as a value of the second AMR. A value of the first AMBTT is set to a value of the AMBTT (the second AMBTT) of the AM in the cluster 2 in step 301, that is, the value of the first AMBTT is the same as a value of the second AMBTT. The first HC is set to the HC value obtained in step 301 plus 1. The last anchor master information is information of an AM in the cluster 1. Therefore, when the NAN device A determines to merge to the cluster 2, the last anchor master information may be set to null or 0. The first TSF needs to synchronize with time information of the cluster 2 to which the NAN device A merges. Therefore, the first TSF is set to a second TSF carried in a message. The role of the NAN device A may be directly set to a master device, and the state is the sync state, or the state is directly the sync state by default. Alternatively, the role and the state of the NAN device A may be the same as the role and the state of the NAN device A in the cluster 1. The cluster identifier (Cluster ID) is set to the ID of the cluster 2 to which the NAN device A is to merge. An HC represents a quantity of hops from a NAN device to an AM, and a TSF represents time information of message sending. Therefore, if the first device receives messages sent by at least two devices of the second device, the third device, and the fourth device, HCs and TSFs in the first cluster information in the messages may be different.

When the role and the state of the NAN device A are set to be the same as the role and the state of the NAN device A in the cluster 1, the role and the state may be specifically a role and a state of the NAN device A before the foregoing sync beacon message is received, or a role and a state of the NAN device A in the cluster 1 when a DW begins, or a role and a state of the NAN device A in the cluster 1 when a DW ends, or the like. This application sets no limitation thereto.

For example, the role of the NAN device A in the cluster 1 is a non-master, and the state is the sync state; therefore, the role of the NAN device A merging to the cluster 2 is still the non-master, and the state is still the sync state. Alternatively, the role of the NAN device A in the cluster 1 is a master, and the state is the sync state by default; therefore, the role of the NAN device A merging to the cluster 2 is still the master, and the state is still the sync state.

When the first device receives the message sent by the third device or the fourth device, that is, receives a message from a device in the first cluster in which the first device is located, the first device may further obtain an MR of the third device or the fourth device. Specifically, if the first device receives the message from the third device, the first cluster information received by the first device further includes an MP value and a random factor (random factor, RF) of the third device, and the first device may calculate the MR of the third device according to at least the MP value, the RF value, and a Media Access Control (Media Access Control, MAC) address of the third device. If the first device receives the message from the fourth device, the first cluster information further includes an MP value and an RF value of the fourth device, and the first device may calculate the MR of the fourth device according to the MP value and the RF value of the fourth device.

In this case, when the role and the state of the first device are set, there are three cases. In a first case, the role of the first device may be set to the master device, and the state is the sync state by default. In a second case, the role and the state of the first device may be set to be the same as the role and the state of the first device in the first cluster. In a third case, a role and state after setting of the first device may be further determined by comparing information before setting of the first device and at least one item of the first cluster information.

For the third case, after receiving the message, the first device may compare an MR, an HC, and an AMBTT of the first device and the MR, an HC, and an AMBTT that are in the received message and that are of the corresponding third device or fourth device. For example, the obtained MR of the third device or the fourth device is higher than a value of the MR of the first device, or an HC value in the message is higher than an HC value of the first device, or an AMBTT value in the message is greater than an AMBTT value of the first device. In this case, when any one condition thereof is met, if a current status of the first device is the master role and the sync state, the first device is updated from the master role and the sync state to the non-master role and the sync state; or if a current status of the first device is the non-master role and the sync state, the first device is updated from the non-master role and the sync state to the non-master role and the non-sync state. Alternatively, before the first device merges to the second cluster, if MR values in (multiple) received messages are all less than an MR value of the first device, or HC values in (multiple) received messages are all less than an HC value of the first device, the first device may be updated from another role to the master role.

Optionally, after receiving the message, the first device may further determine whether the message meets one of a short-distance condition or a remote-distance condition. The short-distance condition is that a received signal strength indicator (Receive Signal Strength Indicator, RSSI) in the message is greater than −60 dBm, and the remote-distance condition is that the RSSI is greater than −75 dBm and less than −60 dBm. If the message meets the short-distance condition, after receiving the message, the first device may perform a setting process of the third case. Alternatively, if the message meets the remote-distance condition, after receiving the message, the first device may perform a setting process of the third case, or may perform a setting process of the first case or the second case.

In this way, after determining to merge to the cluster 2, a NAN device does not merge directly in the master role, and sets an MR to an MR of the NAN device. An HC is not 0, which is an HC of the master role; and an AMBTT is also not 0, which is an AMBTT of the master role. Instead, a role and a state may be set to the master, and a state is sync by default; or a role and a state are the same as a role and a state of the NAN device in the Cluste1r. However, device information is information, of the NAN device, set according to the received information of the cluster 2. Alternatively, the role and the state of the first device are determined by comparing the at least one item of the information before setting of the first device and the at least one item of the first cluster information. Therefore, when the NAN device merges to the cluster 2, the NAN device may synchronize with the AM in the cluster 2 in a timely manner, so that the NAN device newly merging to the cluster 2 may interconnect and intercommunicate with a NAN device in the cluster 2 in a timely manner.

Figure 5:
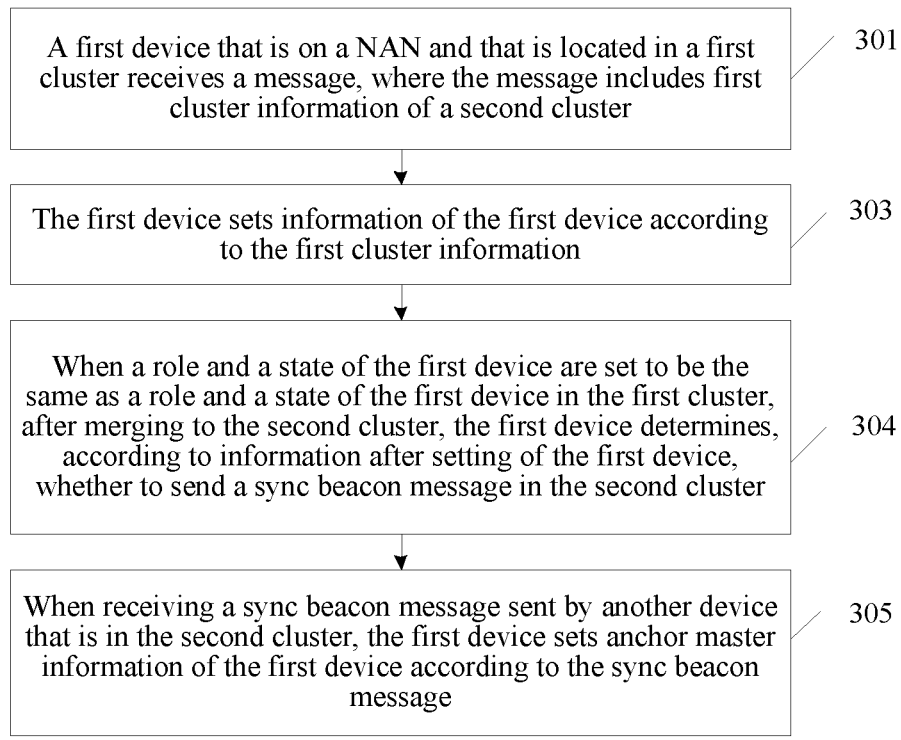
FIG. 5 is a schematic flowchart of a method for sending a beacon and setting anchor master information after a NAN device sets information according to an embodiment of the present invention.

Based on the foregoing description of setting the information of the first device, to resolve the problem of the sync beacon conflict, after merging to the second cluster, the first device may determine, according to information after setting of the first device, whether to send the sync beacon message in the second cluster. Specifically, FIG. 5 is a schematic flowchart of a method for sending a beacon after a NAN device sets information. As shown in FIG. 5, the foregoing method may further include the following step:

304. When a role and a state of the first device are set to be the same as a role and a state of the first device in the first cluster, after merging to the second cluster, the first device determines, according to information after setting of the first device, whether to send a sync beacon message in the second cluster.

Specifically, when the role after setting in step 303 is the master device or the non-master device, and the state after setting is the sync state, the first device determines to send the sync beacon message in the second cluster. The sync beacon message carries at least one item of the information after setting of the first device. If the role after setting is the non-master device, or the state after setting is the non-sync state, the first device determines not to send the sync beacon message in the second cluster.

For example, when the role and state after setting of the NAN device A merging to the cluster 2 are the same as the role and the state of the NAN device A in the cluster 1:

If the role after setting of the NAN device A is the master or the non-master, and the state after setting is the sync state, the NAN device A determines to send the sync beacon message in the cluster 2; or if the role after setting of the NAN device A is the non-master role, and the state after setting is the non-sync state, the NAN device A determines not to send the sync beacon message in the cluster 2.

If the NAN device A determines to send the sync beacon message in the cluster 2, the sync beacon message includes one or more items of a current anchor master record after setting of the NAN device A described in step 302, that is, one or more of an AMR, an HC, an AMBTT, a TSF, a cluster ID, or an MR of the NAN device A after setting.

In this way, when merging to the cluster 2, if the NAN device A determines, according to the original role and state of the NAN device A in the cluster 1, whether to send the sync beacon message, a problem of a conflict between sync beacon messages may be effectively reduced, where the sync beacon messages are sent by means of contention by multiple NAN devices in the cluster 1 because the multiple NAN devices receive the beacon message sent by the NAN device A and merge to the cluster 2 in the master role.

In addition, when being in the master role, the NAN device A may randomly select any backoff value from the backoff interval [0, 15] to send the sync beacon message by means of contention, and the sync beacon message carries information of the current post-setting current anchor master record. When being in a non-master sync state, the NAN device A may randomly select any backoff value from a backoff interval [0, 31] to send the sync beacon message by means of contention, and the sync beacon message carries information of the current post-setting current anchor master record. Therefore, a problem of a conflict between sync beacon messages may be further effectively reduced according to backoff values randomly selected from different backoff intervals in different role and state settings, where the sync beacon messages are sent by means of contention by multiple NAN devices that are in the sync state.

Further, after merging to the second cluster, the first device receives a sync beacon message sent by another NAN device that is in the second cluster. Therefore, the foregoing method further includes step 305:

305. When receiving a sync beacon message sent by another device that is in the second cluster, the first device sets anchor master information of the first device according to the sync beacon message.

Specifically, when receiving a sync beacon message sent by another NAN device that is in the cluster 2, the NAN device A compares information in the received sync beacon message and the information after setting of the NAN device A, to determine whether to modify the anchor master information of the NAN device A to keep synchronized with the another NAN device that is in the cluster 2.

For example, if an AMR in the sync beacon message is greater than the AMR after setting of the NAN device A, it indicates that an MR value of the anchor master device in the cluster 2 is greater than the MR value of the NAN device A, and a preference of the anchor master device in the cluster 2 to function as the anchor master device is higher, and the NAN device A needs to set one or more items of the information in the current anchor master record of the NAN device A according to the information in the sync beacon message: The NAN device A updates the AMR value in the current anchor master record of the NAN device A to the AMR in the sync beacon message; updates TSF time information of the NAN device A to be the same as a value of a TSF in the sync beacon message; updates the AMBTT of the NAN device A to an AMBTT in the sync beacon message; and updates the HC value to an HC value in the sync beacon message plus 1. In addition, the NAN device A sets the last anchor master record of the NAN device A; that is, sets an AMR to the AMR in the current anchor master record before the update, and sets an AMBTT to the AMBTT in the current anchor master record before the update.

If an AMR in the sync beacon message is less than or equal to the AMR after setting of the NAN device A, the NAN device A performs no processing. Alternatively, the NAN device A compares a value of an AMBTT in the sync beacon message and a value of the AMBTT after setting of the NAN device A. If the value of the AMBTT after setting of the NAN device A is less than the value of the AMBTT in the sync beacon message, the NAN device A updates the value of the AMBTT of the NAN device A to the value of the AMBTT in the sync beacon message. This is because the value of the AMBTT in the sync beacon message being greater than the value of the AMBTT of the NAN device A represents that time information is the latest, and the NAN device A needs to synchronize with latest time. If the value of the AMBTT of the NAN device A is greater than the value of the AMBTT in the sync beacon message, the NAN device A performs no processing.

In addition, if an MR value carried in the sync beacon message is greater than the MR value of the NAN device A, when the NAN device A is currently in the master role, the NAN device A needs to update the role of the NAN device A to the non-master role, and the state is still the sync state; or when the NAN device A is currently in the non-master role, and the state is the sync state, the NAN device A needs to update the role of the NAN device A to the non-master role and update the state to the non-sync state; or if an HC value carried in the sync beacon message is less than a current HC value of the NAN device A, when the NAN device A is currently in the master role, the NAN device A needs to update the role of the NAN device A to the non-master role, and the state is still the sync state; or when the NAN device A is currently in the non-master role, and the state is the sync state, the NAN device A needs to update the role of the NAN device A to the non-master role and update the state to the non-sync state; or if an AMBTT value carried in the sync beacon message is greater than a current AMBTT value of the NAN device A, when the NAN device A is currently in the master role, the NAN device A needs to update the role of the NAN device A to the non-master role, and the state is still the sync state; or when the NAN device A is currently in the non-master role, and the state is the sync state, the NAN device A needs to update the role of the NAN device A to the non-master role and update the state to the non-sync state.

Figure 6:
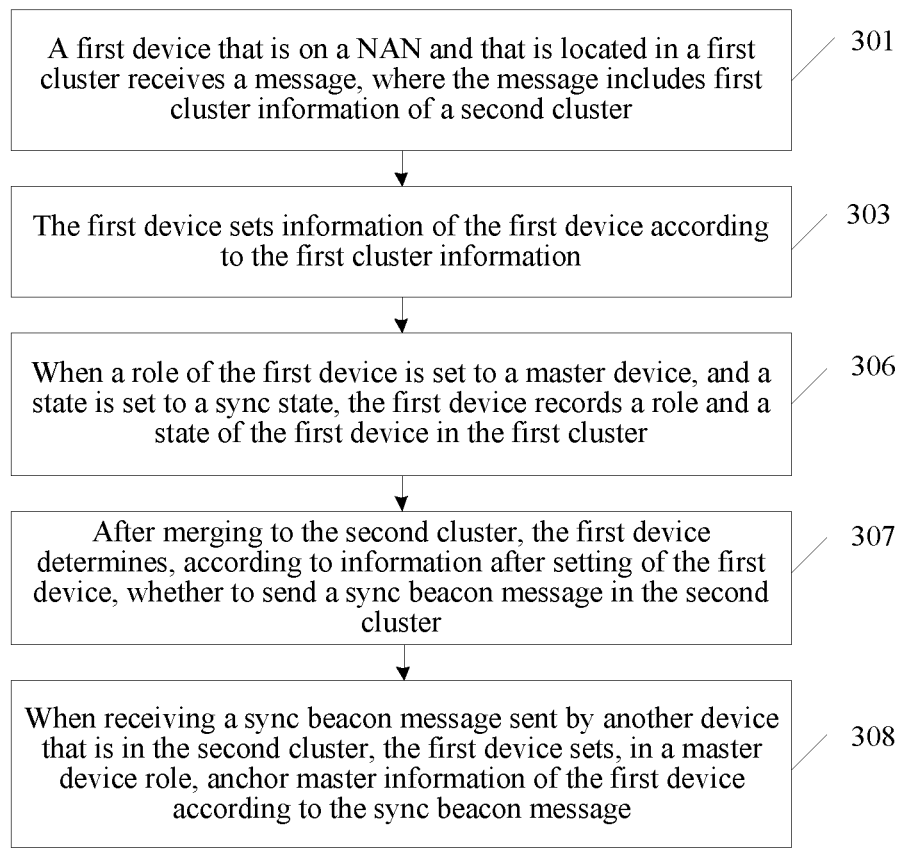
FIG. 6 is a schematic flowchart of a method for sending a beacon and setting anchor master information after a NAN device sets information according to an embodiment of the present invention.

If the role of the first device is set to the master device in step 303, and the state is the sync state, as shown in FIG. 6, FIG. 6 is a schematic flowchart of a method for sending a beacon and setting anchor master information after a NAN device sets information according to an embodiment of the present invention. The foregoing steps 304 and 305 may be replaced by steps 306 to 308.

306. When a role of the first device is set to a master device, and a state is set to a sync state, the first device records a role and a state of the first device in the first cluster.

For example, when merging from the cluster 1 to the cluster 2, although determining that the role after setting is a master, the NAN device A still needs to record the role and the state of the NAN device A in the cluster 1.

307. After merging to the second cluster, the first device determines, according to information after setting of the first device, whether to send a sync beacon message in the second cluster.

Similar to step 304, if the role of the first device in the first cluster is the master device or a non-master device, and the state is the sync state, the first device determines to send the sync beacon message; or if the role of the first device in the first cluster is a non-master device, and the state is the non-sync state, the first device determines not to send the sync beacon message in the second cluster.

In step 304, when the first device merges to the second cluster, the role and the state of the first device are set to be the same as the role and the state of the first device in the first cluster; and in steps 306 and 307, when the first device merges to the second cluster, the role is set to the master device, and the state is the sync state by default. Therefore, steps 306 and 307 are different from step 304. If it is determined to send the sync beacon message in step 307, the sync beacon message carries at least one item of the information after setting of the first device.

For example, although the role is set to the master and the state is set to the sync state after the NAN device A leaves the cluster 1 and merges to the cluster 2, whether to send the sync beacon message is still determined according to the role and the state in the cluster 1 that are recorded by the NAN device A. Information carried in the sent sync beacon message is the information after setting. This may effectively reduce a problem of a conflict between sync beacon messages, where the sync beacon messages are sent by means of contention by multiple NAN devices in the cluster 2 because the multiple NAN devices in the cluster 1 receive the beacon message sent by the NAN device A and merge to the cluster 2 in the master role.

Similarly, when being in the master role in the cluster 1, after merging to the cluster 2, the NAN device A may randomly select any backoff value from the backoff interval [0, 15] to send the sync beacon message by means of contention, and the sync beacon message carries information of the current post-setting current anchor master record. When being in a non-master sync state, the NAN device A may randomly select any backoff value from a backoff interval [0, 31] to send the sync beacon message by means of contention, and the sync beacon message carries information of the current post-setting current anchor master record. Therefore, a problem of a conflict between sync beacon messages may be further effectively reduced according to backoff values randomly selected from different backoff windows in different role and state settings, where the sync beacon messages are sent by means of contention by multiple NAN devices in the cluster 2 that are in the sync state.

Further, after merging to the second cluster, the first device receives a sync beacon message sent by another NAN device that is in the second cluster. Therefore, the foregoing method further includes the following step 308:

308. When receiving a sync beacon message sent by another device that is in the second cluster, the first device sets, in a master device role, anchor master information of the first device according to the sync beacon message.

Specifically, when receiving a sync beacon message sent by another NAN device that is in the cluster 2, the NAN device A compares information in the received sync beacon message and the information after setting of the NAN device A, to determine whether to still function as the master device, and whether to modify the anchor master information of the NAN device A to keep synchronized with the another NAN device that is in the cluster 2.

For example, if an AMR value in the sync beacon message is greater than the AMR value of the NAN device A, the NAN device A no longer functions as the master role, and needs to update the role of the NAN device A to a non-master and updates one or more items of the information of the current anchor master record: updating the AMR to the AMR in the sync beacon message, updating the value of the TSF to a value of a TSF in the sync beacon message, updating the value of the AMBTT to an AMBTT in the sync beacon message, and updating the HC value to an HC value in the sync beacon message plus 1. In addition, the NAN device A sets the last anchor master record of the NAN device A; that is, sets an AMR to the AMR in the current anchor master record before the update, and sets an AMBTT to the AMBTT in the current anchor master record before the update.

If an AMR in the sync beacon message is less than the AMR after setting of the NAN device A, the NAN device A performs no processing. If an AMR in the sync beacon message is equal to the AMR after setting of the NAN device A, the NAN device performs no processing either. Alternatively, the NAN device A compares a value of an AMBTT in the sync beacon message and the value of the AMBTT after setting of the NAN device A. If the value of the AMBTT of the NAN device A is less than the value of the AMBTT in the sync beacon message, the NAN device A updates the value of the AMBTT of the NAN device A to the value of the AMBTT in the sync beacon message; or if the value of the AMBTT of the NAN device A is greater than the value of the AMBTT in the sync beacon message, the NAN device A performs no processing.

In addition, similar to step 305, if an MR value carried in the sync beacon message is greater than the MR value of the NAN device A, when the NAN device A is currently in the master role, the NAN device A needs to update the role of the NAN device A to the non-master role, and the state is still the sync state; or when the NAN device A is currently in the non-master role, and the state is the sync state, the NAN device A needs to update the role of the NAN device A to the non-master role and update the state to the non-sync state; or if an HC value carried in the sync beacon message is less than a current HC value of the NAN device A, when the NAN device A is currently in the master role, the NAN device A needs to update the role of the NAN device A to the non-master role, and the state is still the sync state; or when the NAN device A is currently in the non-master role, and the state is the sync state, the NAN device A needs to update the role of the NAN device A to the non-master role and update the state to the non-sync state; or if an AMBTT value carried in the sync beacon message is greater than a current AMBTT value of the NAN device A, when the NAN device A is currently in the master role, the NAN device A needs to update the role of the NAN device A to the non-master role, and the state is still the sync state; or when the NAN device A is currently in the non-master role, and the state is the sync state, the NAN device A needs to update the role of the NAN device A to the non-master role and update the state to the non-sync state.

Figure 7:
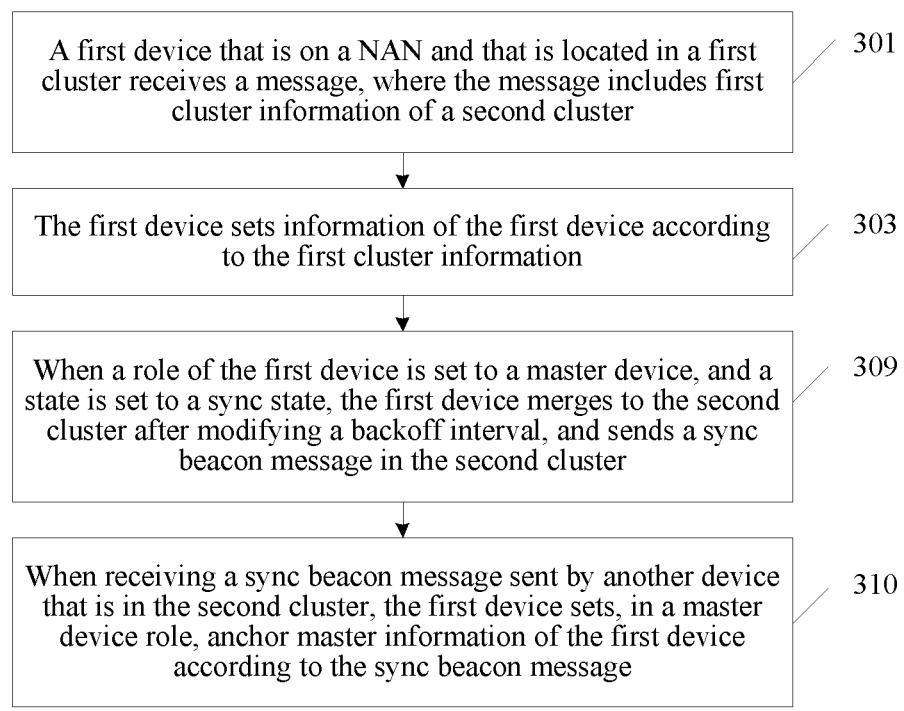
FIG. 7 is a schematic flowchart of a method for sending a beacon and setting anchor master information after a NAN device sets information according to an embodiment of the present invention.

If the role of the first device is set to the master device in step 303, and the state is the sync state, as shown in FIG. 7, FIG. 7 is a schematic flowchart of a method for sending a beacon and setting anchor master information after a NAN device sets information according to an embodiment of the present invention. The foregoing steps 304 and 305 or steps 306 to 308 may be replaced by steps 309 and 310.

309. When a role of the first device is set to a master device, and a state is set to a sync state, the first device merges to the second cluster after modifying a backoff interval, and sends a sync beacon message in the second cluster.

For example, when the role of the NAN device A is set to the master and the state is set to the sync state when the NAN device A leaves the cluster 1 and merges to the cluster 2, a newly defined backoff interval may be used. The newly defined backoff interval is greater than the backoff interval [0, 15] before the modification, for example, [0, 50] or another greater interval [0, X], where X is greater than 15 or greater than 31, but X is less than a length value of a DW, so that the newly defined backoff interval is greater than the backoff interval before the modification. In this way, the role of the NAN device A after the NAN device A merges to the cluster 2 is the master, and the state of the NAN device A is the sync state by default; multiple NAN devices in the cluster 1 also merge to the cluster 2 in the master role because the multiple NAN devices receive a beacon message sent by the NAN device A, so that the multiple NAN devices in the master role in the cluster 2 send a sync beacon message by means of contention. However, because the newly defined backoff interval that is greater is used, a probability that backoff values randomly selected by the multiple master roles are duplicate may be reduced, thereby effectively reducing a problem of a conflict during sync beacon sending.

The sync beacon message sent by the first device carries the information of the current anchor master record after setting in step 303.

Further, after merging to the second cluster, the first device receives a sync beacon message sent by another NAN device that is in the second cluster. Therefore, the foregoing method further includes step 310:

310. When receiving a sync beacon message sent by another device that is in the second cluster, the first device sets, in a master device role, anchor master information of the first device according to the sync beacon message.

A specific implementation of step 310 is similar to that of step 308, and details are described herein again.

Figure 8:
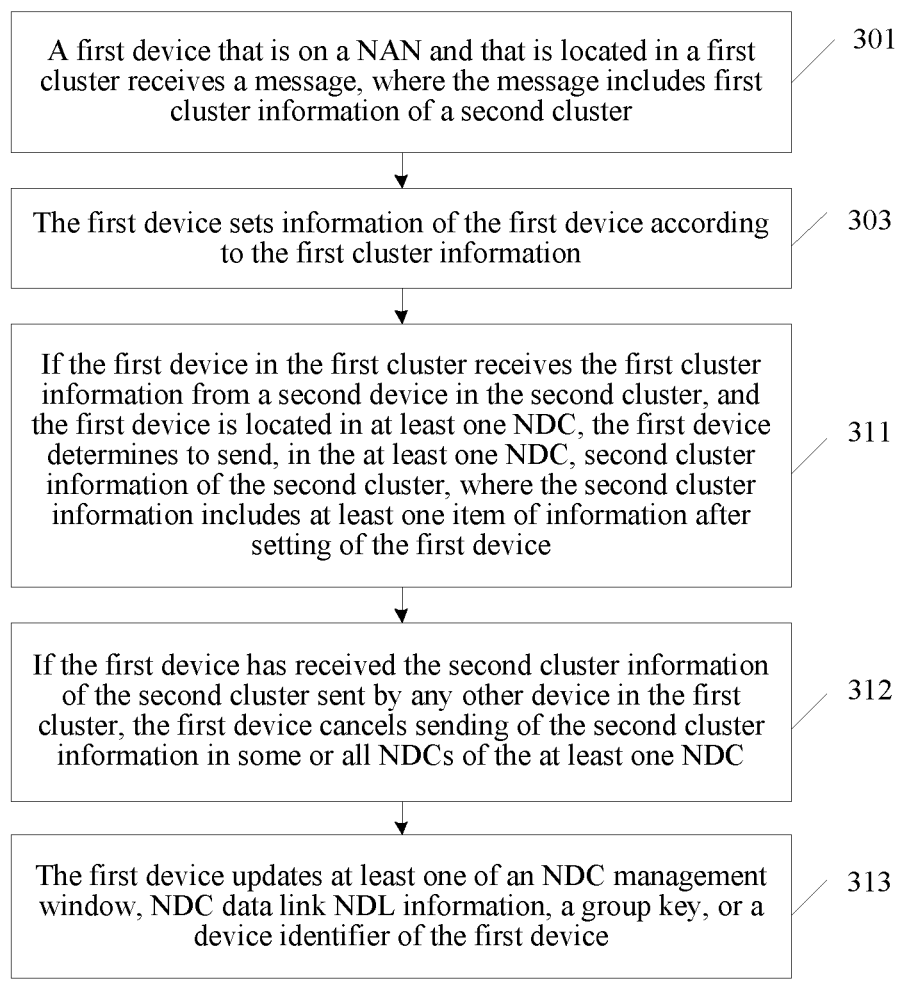
FIG. 8 is a schematic flowchart of a method for spreading cluster information after a NAN device sets information according to an embodiment of the present invention.

Further, in the prior art, when the first device a sync beacon message or a discovery beacon message that includes the cluster information of the second cluster, the first device sends the sync beacon message in a broadcast manner in the DW of the first cluster. The sync beacon message includes the cluster information of the second cluster, so that a device that is in the first cluster and that obtains, through listening, the sync beacon message may also merge to the second cluster. However, the cluster information of the second cluster received by the first device in the first cluster may be from a sync beacon message or a discovery beacon message sent by the second device in the second cluster, or may be from an NDC message sent by the third device in the first cluster, or a received message that is sent by the fourth device in the first cluster and that includes the first cluster information of the second cluster. In the prior art, the cluster information of the second cluster is spread only in a broadcast manner. Therefore, some NAN devices in the first cluster cannot receive the message. That is, a spreading scope is limited. In this application, if the first device receives the message sent by the second device in the second cluster, and the first device belongs to at least one NDC in the first cluster, the first device needs to send an NDC message in the at least one NDC, where the NDC message includes the cluster information of the second cluster, so that a device that is in the at least one NDC in the first cluster and that obtains the NDC message through listening merges to the second cluster. Alternatively, when the first device receives an NDC message sent by the third device in an NDC in which the first device is located, the first device may also send the NDC message in multiple NDCs in which the first device is located, so that a device in the multiple NDCs merges to the second cluster. Alternatively, the first device may broadcast, in the first cluster, the message sent by the fourth device. Therefore, before the first device merges to the second cluster, as shown in FIG. 8, FIG. 8 is a schematic flowchart of a method for spreading cluster information after a NAN device sets information according to an embodiment of the present invention. The following steps 311 to 313 are performed after the foregoing step 303, and are performed before steps 304 and 305, before steps 306 to 308, or before steps 309 and 310. The foregoing method further includes the following steps.

311. If the first device in the first cluster receives the first cluster information from a second device in the second cluster, and the first device is located in at least one NDC, the first device determines to send, in the at least one NDC, second cluster information of the second cluster, where the second cluster information includes at least one item of information after setting of the first device.

For example, the NAN device A in the cluster 1 receives a sync beacon message or a discovery beacon message sent by the NAN device B in the cluster 2. The message includes the information of the cluster 2, that is, the first cluster information, and specifically includes one or more of the ClusterID, the AMR, the TSF, the AMBTT, or the HC. If the NAN device A is located in multiple NDCs in the cluster 1, after the NAN device A sets the information of the NAN device A according to the first cluster information, the NAN device A sends the second cluster information of the second cluster in management windows of the multiple NDCs, where the second cluster information includes at least one item of the information after setting of the NAN device A. A message by which the NAN device A sends the second cluster information may be a sync beacon message or an announcement frame message. That the NAN device A sends the second cluster information in the management windows of the multiple NDCs means that the second cluster information not only needs to be sent in a management window of an NDC1 to which the NAN device A belongs, but also needs to be sent in a management window of an NDC2 or the like to which the NAN device A belongs.

A format of the sync beacon message or the announcement frame message may use a prior-art sync beacon message format, an action message format, or service discovery (service discovery frame, SDF) message format, or use a newly defined message format.

If the NAN device A receives, when determining to send the information of the cluster 2 in an NDC, the information of the cluster 2 sent by another device, the NAN device A cancels sending the information of the cluster 2 in the NDC. Therefore, the method further includes the following step:

312. If the first device has received the second cluster information of the second cluster sent by any other device in the first cluster, the first device cancels sending of the second cluster information in some or all NDCs of the at least one NDC.

In this way, the NAN device A may be prevented from repeatedly sending the information of the cluster 2 in the cluster 1, thereby reducing air interface overheads.

Specifically, when determining whether to cancel sending an NDC message, the first device may perform the determining by comparing information carried in the second cluster information sent by the any device and the information after setting of the first device. For example, if the first AMBTT after setting in step 303 is less than a fourth AMBTT carried in the second cluster information, or the first HC is greater than a fourth HC carried in the second cluster information, or the first AMR is less than a fourth AMR carried in the second cluster information, or the device rank MR of the first device is less than an MR of the any device, or the HC of the first device is greater than an HC of the any device, the first device cancels sending the first cluster information in the at least one NDC.

It should be noted that, when the first device determines to send the second cluster information in the NDC in which the first device is located, the second cluster information may further include information about a time or a time period when the first device merges to the second cluster, to notify an NAN device in the NDC that the first device merges to the second cluster when the information about the time period arrives, so that the device in the NDC merges to the second cluster at the same time. For example, the first device is communicating, for example, chatting, with another device in the NDC, and after another device merges to the second cluster at the same time, an ongoing service is not affected.

313. The first device updates at least one of an NDC management window, NDC data link NDL information, a group key, or a device identifier of the first device.

For example, when the NAN device A is located in an NDC, the NAN device A changes the NDC management window of the NAN device A to a management window of a DW of the cluster 2. The original NDC management window is an offset 1 from a start time of the NDC management window to a DW of the cluster 1, and a modified NDC management window is an offset 2 from the start time of the NDC management window to the DW of the cluster 2. Specifically, the NDC management window may be modified according to an AMBTT (that is, the AMBTT of the cluster 2) in the message received by the first device and an AMBTT in the cluster 1 in which the first device is located, or modified according to a TSF offset in the received message. The offset may be described in a form of a bit table (bitmap). A bitmap that is set to 1 and that is in the bit table represents that the time unit is available, and a bitmap that is set to 0 or null represents that the NAN device A enters a sleep state in a time period indicated by the time unit. As shown in Table 1, 16 TUs are used as a minimum time unit at which a device works in a channel. In every 16 TUs, the NAN device A stays in the sleep state or works in a channel. A location corresponding to a bit which is set to 1 in the bit table is used as an NDC management window of the NAN device A, and the NAN device A needs to be awake in this time period.

TABLE 1

| | Channel number | Minimum time unit duration | Available time-frequency resource bitmap | | | | | | | | | | | | | | | |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| Time-frequency resource supported by the device | 1 | 16 TUs | | | | | | | | | | | | | | | | |
| | 6 | 16 TUs | 1 | 1 | 1 | 1 | 1 | 1 | | | | | | | | | | |
| | 11 | 16 TUs | | | | | | | 1 | 1 | 1 | 1 | 1 | 1 | 1 | 1 | 1 | 1 |

An NDL is a time-frequency resource negotiated between NAN devices, and includes a channel and a time. When the NAN device A merges to the cluster 2, information of the NDL, that is, an NDL schedule, needs to be modified, or modified through negotiation; and specifically, may be modified according to a bit table of the NDC management window.

When merging to the cluster 2, the NAN device A also needs to update the group key (group key), so that NAN devices in different groups can communicate with each other. NAN devices using a same group identifier (group ID) may be of a same group, or NAN devices supporting a same service may be of a same group, or NAN devices belonging to a same geographical location are of a same group, or multiple NAN devices that need to perform data communication with each other are of a same group. This application sets no limitation thereto. The group key may be generated based on the first four octets (octet), that is, the first four bytes, of a TSF. Specifically, the group key may be updated by using the first four bytes of the TSF as a part of the group key. In addition, when the NAN device A merges to the cluster 2, a device identifier (device identifier, service identity) of the NAN device A in the cluster 2 further needs to be updated. Specifically, a new SID may be generated by performing hash computation with reference to at least some information of the TSF and a device name; a new SID may be generated by performing hash computation with reference to at least some information of the group key and a device name; or the like. This application sets no limitation thereto. In this way, after the NAN device A spreads the cluster information of the second cluster in the NDC in the cluster 1, a spreading scope of the cluster information of the second cluster is enlarged, and faster spreading of the cluster information may be implemented by using the NDC.

Figure 9:
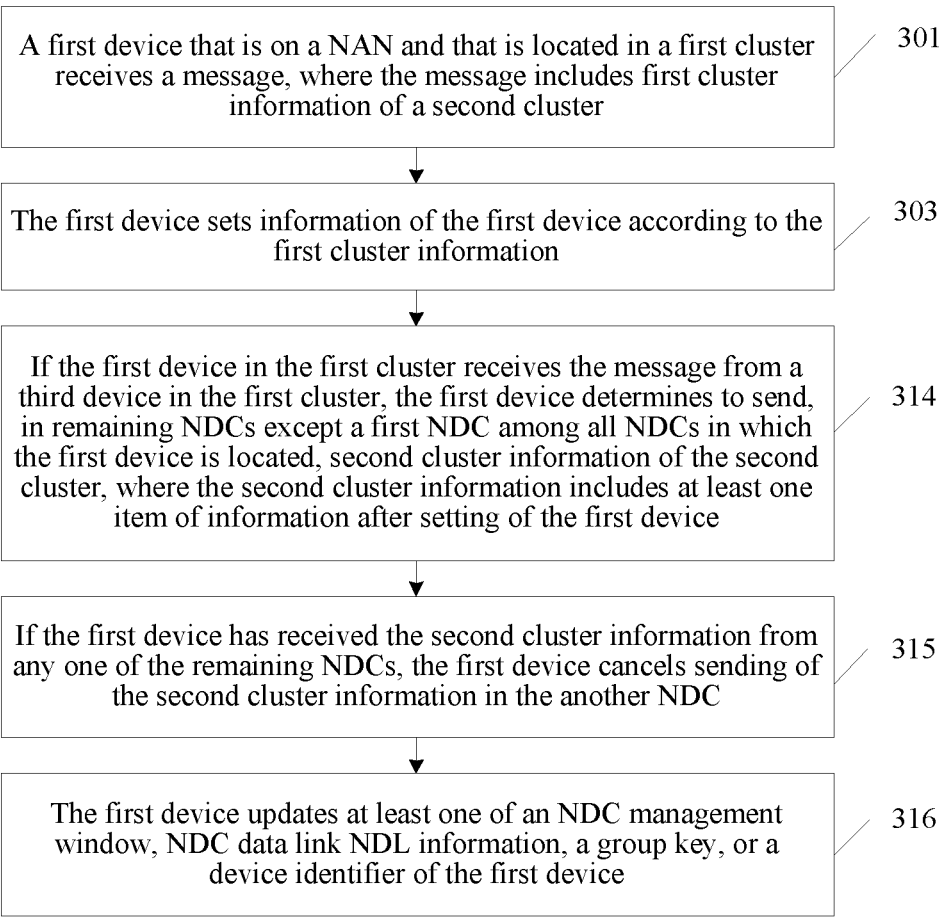
FIG. 9 is a schematic flowchart of a method for spreading cluster information after a NAN device sets information according to an embodiment of the present invention.

Alternatively, as shown in FIG. 9, FIG. 9 is a schematic flowchart of a method for spreading cluster information after a NAN device sets information according to an embodiment of the present invention. The foregoing steps 311 to 313 may also be replaced by steps 314 to 316.

314. If the first device in the first cluster receives the message from a third device in the first cluster, the first device determines to send, in another NDC except a first NDC among all NDCs in which the first device is located, second cluster information of the second cluster, where the second cluster information includes at least one item of information after setting of the first device.

It is described in step 301 that the third device is located in the first NDC in the first cluster, where the first NDC is denoted as an NDC1. That is, if the first device receives the first cluster information from a device in the NDC1 in which the first device is located, after the first device sets the information of the first device according to the first cluster information, the first device also needs to send, in the remaining NDCs (for example, an NDC2) except the NDC1 among all NDCs in which the first device is located, the second cluster information of the second cluster, where the second cluster information includes at least one item of the information after setting of the first device. A message format used by the first device to send the second cluster information may be that described in step 311. Details are not described herein again.

315. If the first device has received the second cluster information from any one of the remaining NDCs, the first device cancels sending of the second cluster information in the remaining NDCs.

In this way, the second cluster information may be prevented from being repeatedly sent in the NDC in which the first cluster is located, thereby saving an air interface resource.

316. The first device updates at least one of an NDC management window, NDC data link NDL information, a group key, or a device identifier of the first device.

For a specific implementation of this step, refer to the foregoing step 313. Details are not described herein again.

Figure 10:
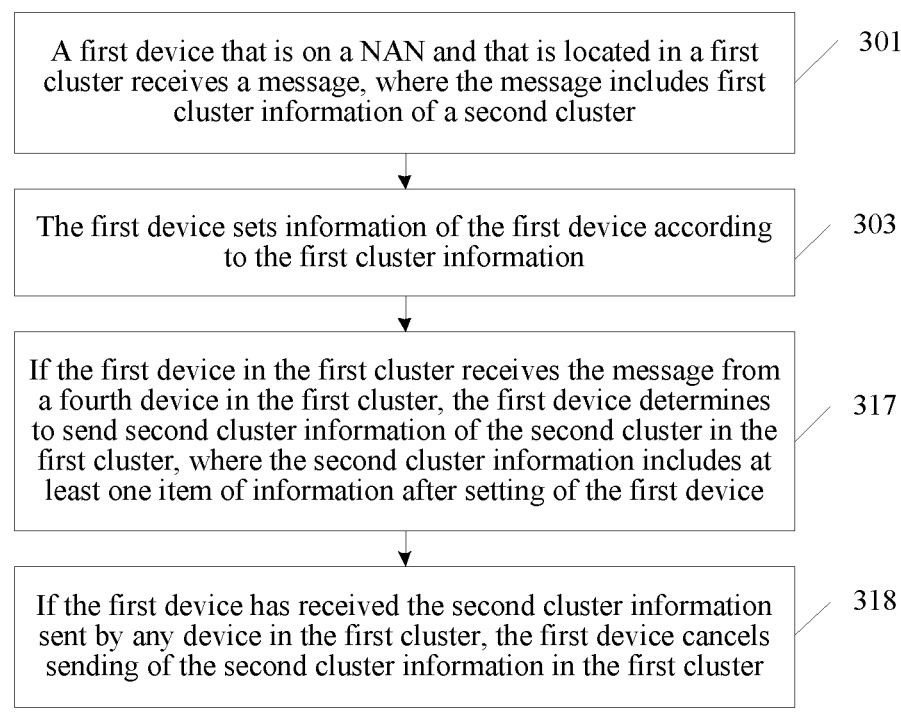
FIG. 10 is a schematic flowchart of a method for spreading cluster information after a NAN device sets information according to an embodiment of the present invention.

Alternatively, as shown in FIG. 10, FIG. 10 is a schematic flowchart of a method for spreading cluster information after a NAN device sets information according to an embodiment of the present invention. The foregoing steps 311 to 313 or steps 314 to 316 may also be replaced by steps 317 and 318.

317. If the first device in the first cluster receives the message from a fourth device in the first cluster, the first device determines to send second cluster information of the second cluster in the first cluster, where the second cluster information includes at least one item of information after setting of the first device.

When the fourth device does not belong to any NDC or belongs to all NDCs in the first cluster, if the fourth device receives the first cluster information, the fourth device may broadcast the first cluster information in the first cluster. After receiving the message that includes the first cluster information and setting the information of the first device according to the first cluster information, the first device may broadcast the second cluster information of the second cluster in the first cluster. The second cluster information includes at least one item of the information after setting of the first device. Therefore, another device that is in the first cluster and that receives the second cluster information may also merge to the second cluster. A used message format may be that described in step 311. Details are not described herein again.

318. If the first device has received the second cluster information sent by any device in the first cluster, the first device cancels sending of the second cluster information in the first cluster.

In this way, the first cluster information may be prevented from being repeatedly sent in the first cluster, thereby saving an air interface resource.

In summary, in this application, when receiving the first cluster information of the second cluster, the first device in the first cluster may set the information of the first device according to the first cluster information of the second cluster, so that the first device can interconnect and intercommunicate with a device in the second cluster in a timely manner after merging to the second cluster. Further, after the first device merges to the second cluster, whether to send the sync beacon message in the second cluster is determined according to the information after setting of the first device. In this way, a conflict that is caused because multiple devices that merge to the second cluster send a sync beacon message in the second cluster and that may cause a device in the second cluster to fail to receive the message can be avoided. Even further, after setting the information of the first device, the first device may broadcast the information after setting in the first cluster, or send the information after setting in the NDC in which the first device is located, so that a device that obtains the information through listening also merges to the second cluster. This may enlarge a spreading scope of the cluster information of the second cluster, and implement faster spreading of the cluster information by using the NDC.

Figure 11:
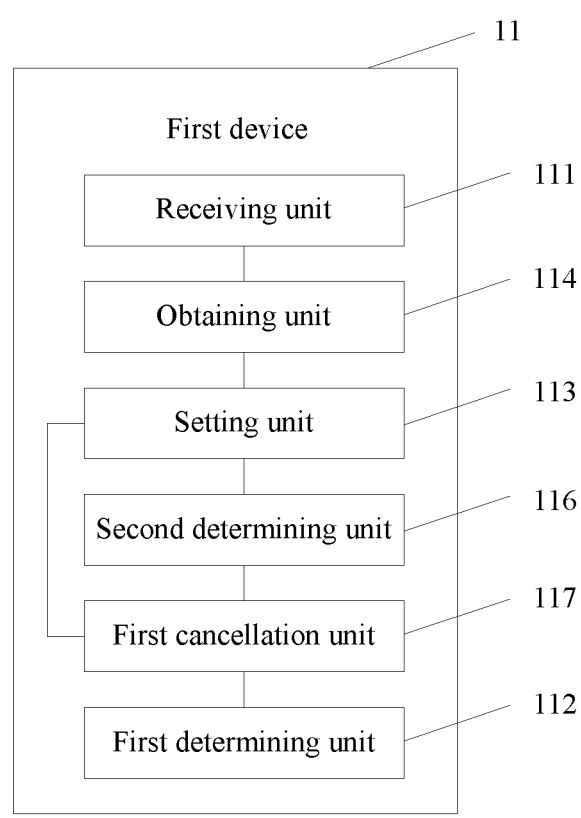
FIG. 11 is a schematic structural diagram of a first device according to an embodiment of the present invention.

An embodiment of the present invention further provides a first device 11. The first device 11 is located on a neighbor awareness network NAN, and as shown in FIG. 11, includes:

a receiving unit 111, configured to receive a message, where the message includes first cluster information of a second cluster; and a first determining unit 112, configured to: when the first device determines to merge to the second cluster, send a sync beacon message in the second cluster according to a role and a state of the first device in a first cluster; or a sending unit 113 (not shown in the figure), configured to send the sync beacon message in the second cluster after a backoff interval is modified.

Optionally, the first determining unit 112 is configured to: if the role and the state of the first device in the first cluster is a master device or a non-master device, and the state is a sync state, send, by the first device, the sync beacon message in the second cluster.

The first device may further include:

a setting unit 113, configured to: before the first device sends the sync beacon message, set information of the first device according to the first cluster information.

Optionally, the receiving unit 111 may be configured to:

receive a message sent by a second device that is in the second cluster, where the message includes the first cluster information of the second cluster; or receive a message sent by a third device that is in the first cluster, where the third device is located in a first NAN data cluster NDC of the first cluster, and the message includes the first cluster information of the second cluster; or receive a message sent by a fourth device that is in the first cluster, where the message includes the first cluster information of the second cluster.

The first cluster information includes at least one of a cluster identifier of the second cluster, a first anchor master rank AMR, a first anchor master beacon transmission time AMBTT, a first time synchronization function TSF, or a first hop count HC.

Optionally, the setting unit 113 may be configured to:

set at least one of a cluster identifier of the first device, anchor master information, a second TSF, or a role and a state of the first device, where the cluster identifier of the first device is the cluster identifier of the second cluster;

the anchor master information includes at least one of a second AMR, a second AMBTT, or a second HC, where a value of the second AMR is the same as a value of the first AMR, a value of the second AMBTT is the same as a value of the first AMBTT, and a value of the second HC is a value of the first HC plus 1;

the second TSF is the same as the first TSF; and the role of the first device is a master device, and the state is a sync state by default; or the role and the state of the first device are the same as the role and the state of the first device in the first cluster; or a role and state after setting of the first device are determined by comparing at least one item of information before setting of the first device and at least one item of the first cluster information, where the information before setting includes an auxiliary master rank MR before setting of the first device, an HC before setting, and an AMBTT before setting.

Optionally, the receiving unit 111 may be configured to:

receive a message sent by a second device that is in the second cluster, where the message includes the first cluster information of the second cluster; or receive a message sent by a third device that is in the first cluster, where the third device is located in a first NAN data cluster NDC of the first cluster, and the message includes the first cluster information of the second cluster; or receive a message sent by a fourth device that is in the first cluster, where the message includes the first cluster information of the second cluster.

Optionally, before the information of the first device is set, the first device further includes an obtaining unit 114, configured to: if the first device receives the message from the second device, obtain an MR of the second device;

if the first device receives the message from the third device, obtain an MR of the third device; or if the first device receives the message from the fourth device, obtain an MR of the fourth device.

Optionally, the first determining unit 112 is configured to: after the first device merges to the second cluster, determine whether to send the sync beacon message in the second cluster; and optionally, when the role and the state of the first device are set to be the same as the role and the state of the first device in the first cluster, and if the role after setting is the master device or a non-master device, and the state after setting is the sync state, determine to send the sync beacon message in the second cluster; or if the role after setting is a non-master device, and the state after setting is a non-sync state, determine not to send the sync beacon message in the second cluster.

Optionally, when the role of the first device is set to the master device, the first device further includes:

a recording unit 115, not shown in the figure, and configured to: when the role of the first device is set to the master device, record the role and the state of the first device in the first cluster, where the first determining unit 112 is configured to:

if the role of the first device in the first cluster is the master device or a non-master device, and the state is the sync state, determine to send the sync beacon message; or if the role of the first device in the first cluster is a non-master device, and the state is a non-sync state, determine not to send the sync beacon message in the second cluster.

Optionally, the sending unit 113 may be configured to: when the role of the first device is set to the master device, modify a backoff interval, where a modified backoff interval is greater than the backoff interval before the modification; and send the sync beacon message in the second cluster according to the modified backoff interval, where the sync beacon message carries at least one item of information after setting of the first device.

Optionally, the first device may further include a second determining unit 116, configured to:

if the first device receives the first cluster information sent by the second device, and the first device is located in at least one NDC, determine, by the first device, to send, in the at least one NDC, second cluster information of the second cluster, where the second cluster information includes at least one item of information after setting of the first device.

Optionally, the first device may further include:

a first cancellation unit 117, configured to: if the first device has received the second cluster information sent by any other device in the first cluster, cancel sending of the second cluster information in the at least one NDC.

Optionally, the first cancellation unit 117 may be configured to:

compare information that is carried in the second cluster information sent by the any device and the information after setting of the first device; and if the first AMBTT is less than a fourth AMBTT carried in the second cluster information, or the first HC is greater than a fourth HC carried in the second cluster information, or the first AMR is less than a fourth AMR carried in the second cluster information, or the device rank MR of the first device is less than an MR of the any device, cancel sending of the second cluster information in the at least one NDC.

Figure 12:
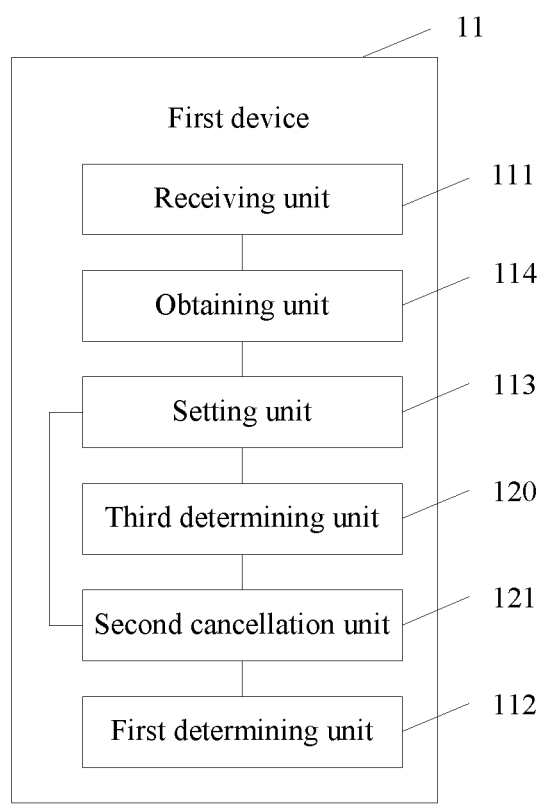
FIG. 12 is a schematic structural diagram of a first device according to an embodiment of the present invention.

Optionally, as shown in FIG. 12, the first device may further include a third determining unit 120, configured to:

if the first device receives the message from the third device, determine to send, in another NDC except the first NDC among all NDCs in which the first device is located, second cluster information of the second cluster, where the second cluster information includes at least one item of information after setting of the first device.

Optionally, the first device may further include:

a second cancellation unit 121, configured to: if the first device has received the second cluster information from any one of the remaining NDCs, cancel sending of the second cluster information in the remaining NDCs.

Figure 13:
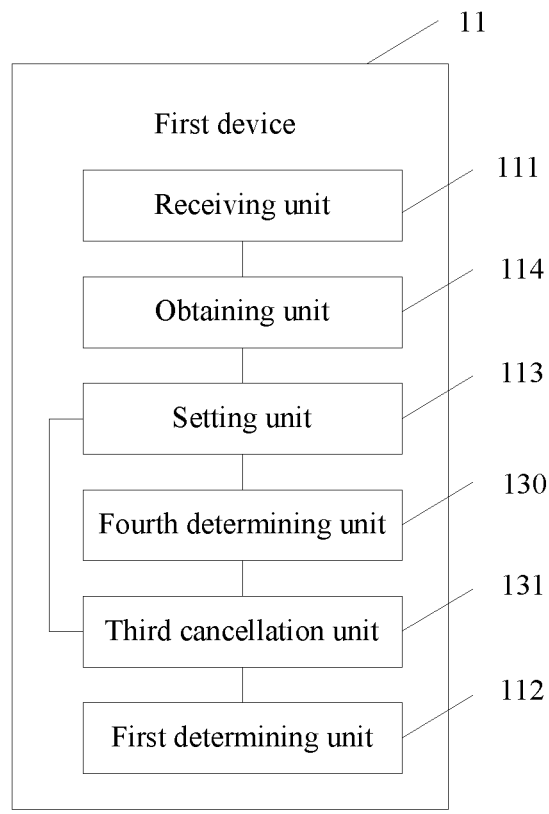
FIG. 13 is a schematic structural diagram of a first device according to an embodiment of the present invention.

Optionally, as shown in FIG. 13, the first device may further include a fourth determining unit 130, configured to:

if the first device receives the message from the fourth device, determine to send second cluster information of the second cluster in the first cluster, where the second cluster information includes at least one item of information after setting of the first device.

Optionally, the first device further includes a third cancellation unit 131, configured to:

if the first device has received the second cluster information sent by any device in the first cluster, cancel sending of the second cluster information in the first cluster.

Optionally, the setting unit 113 may be further configured to:

update at least one of an NDC management window, NDC data link NDL information, a group key, or a device identifier of the first device.

According to this embodiment of the present invention, when receiving the first cluster information of the second cluster, the first device may set the information of the first device according to the first cluster information of the second cluster, so that the first device can interconnect and intercommunicate with a device in the second cluster in a timely manner after merging to the second cluster. Further, after the first device merges to the second cluster, whether to send the sync beacon message in the second cluster is determined according to the information after setting of the first device. In this way, a conflict that is caused because multiple devices that merge to the second cluster send a sync beacon message in the second cluster and that may cause a device in the second cluster to fail to receive the message can be avoided. Even further, after setting the information of the first device, the first device may broadcast the information after setting in the first cluster, or send the information after setting in the NDC in which the first device is located, so that a device that obtains the information through listening also merges to the second cluster. This may enlarge a spreading scope of the cluster information of the second cluster, and implement faster spreading of the cluster information by using the NDC.

Figure 14:
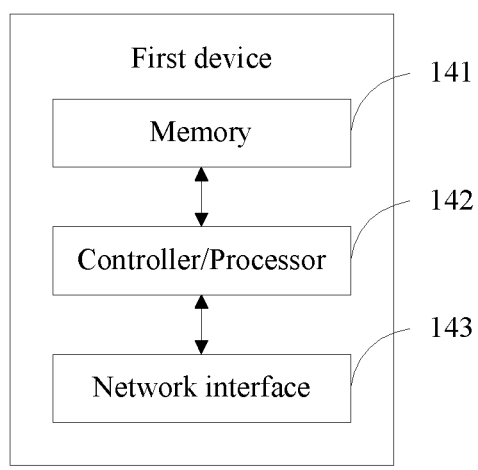
FIG. 14 is a schematic structural diagram of a first device according to an embodiment of the present invention.

FIG. 14 shows a schematic structural diagram of the first device in the foregoing embodiment. The first device may be a NAN device in the network architecture shown in FIG. 1 or FIG. 2.

The first device includes a controller/processor 142, a memory 141, and a network interface 143. The controller/processor 142 is configured to control and manage an action of the first device. For example, the controller/processor 142 is configured to support the first device in performing: steps 301 and 302 in the process in FIG. 3; steps 301 to 303 in the process in FIG. 4; steps 301, 303, 304, and 305 in the process in FIG. 5; steps 301, 303, and 306 to 308 in the process in FIG. 6; steps 301, 303, 309, and 310 in the process in FIG. 7; steps 301, 303, and 311 to 313 in the process in FIG. 8; steps 301, 303, and 314 to 316 in the process in FIG. 9; steps 301, 303, 317, and 318 in the process in FIG. 10; and/or another process used in the technology described in the embodiments of the present invention. The memory 141 is configured to store program code and data of the first device. The network interface 143 is configured to support the first device in communicating with another device in a first cluster or a second cluster. For another example, the network interface 143 is configured to support the first device in communicating with each NAN device shown in FIG. 1 or FIG. 2.

According to this embodiment of the present invention, when receiving the first cluster information of the second cluster, the first device may set the information of the first device according to the first cluster information of the second cluster, so that the first device can interconnect and intercommunicate with a device in the second cluster in a timely manner after merging to the second cluster.

In the several embodiments provided in this application, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the devices and systems in the embodiments of the present invention may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (Read Only Memory, ROM for short), a random access memory (Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending a sync beacon frame by a neighbor awareness network (NAN) device, comprising:
   receiving, by a first device that is in a first cluster, a message, wherein the message comprises first cluster information of a second cluster, wherein the first cluster information of the second cluster comprises at least one of a cluster identifier of the second cluster, a first anchor master rank (AMR), a first anchor master beacon transmission time (AMBTT), a first time synchronization function (TSF), or a first hop count HC);
   setting, by the first device, information of the first device according to the first cluster information of the second cluster, wherein the setting comprises;
      setting, by the first device, at least one of a cluster identifier of the first device, anchor master information, a second TSF, or a role and a state of the first device, and wherein setting comprises at least one of:
      the cluster identifier of the first device is set to be the same as the cluster identifier of the second cluster;
      the anchor master information comprises a second AMR and a second AMBTT, wherein a value of the second AMBTT is set to be equal a value of the first AMBTT;
      the second TSF is set to be the same as the first TSF; or
      the role and the state of the first device are set to be the same as the role and the state of the first device in the first cluster;
   merging, by the first device, to the second cluster; and
   after merging to the second cluster, sending, by the first device, a sync beacon message in the second cluster when the first device in the first cluster is in a sync state.

2. The method according to claim 1, wherein the anchor master information comprises a second HC, and wherein a value of the second HC is set to be equal a value of the first HC plus one.

3. The method according to claim 1, wherein receiving, by a first device in a first cluster, a message, wherein the message comprises first cluster information of the second cluster comprises:
- receiving, by the first device, a message from a second device that is in the second cluster, wherein the message comprises the first cluster information of the second cluster; or
- receiving, by the first device, a message from a third device that is in the first cluster, wherein the third device is in a first NAN data cluster (NDC) of the first cluster, and the message comprises the first cluster information of the second cluster; or
- receiving, by the first device, a message from a fourth device that is in the first cluster, wherein the message comprises the first cluster information of the second cluster.

4. The method according to claim 1, further comprising not sending, by the first device, the sync beacon message in the second cluster when a role of the first device in the first cluster is a non-master device and the state of the first device in the first cluster is a non-sync state.

5. The method according to claim 1, further comprising not sending, by the first device, the sync beacon message in the second cluster when a role of the first device in the first cluster is a non-master device and the state of the first device in the first cluster is a non-sync state.

6. The method according to claim 1, wherein when merging to the second cluster, a role and a state of the first device are the same as the role and the state of the first device in the first cluster.

7. The method according to claim 1, wherein the cluster identifier of the second cluster is different from the cluster identifier of the first cluster and a cluster grade (CG) value of the second cluster is greater than a CG value of the first cluster.

8. The method according to claim 5, wherein the cluster identifier of the second cluster is different from the cluster identifier of the first cluster and a cluster grade (CG) value of the second cluster is greater than a CG value of the first cluster.

9. A first device, wherein the first device is a neighbor awareness network (NAN) device, and comprises:
- a memory storage comprising instructions; and
- a processor in communication with the memory, wherein the processor executes the instructions to:
  - receive a message, wherein the message comprises first cluster information of a second cluster, wherein the first cluster information of the second cluster comprises at least one of a cluster identifier of the second cluster, a first anchor master rank (AMR), a first anchor master beacon transmission time (AMBTT), a first time synchronization function (TSF), or a first hop count HC;
  - set information of the first device according to the first cluster information of the second cluster, wherein the setting comprises;
    - setting, by the first device, at least one of a cluster identifier of the first device, anchor master information, a second TSF, or a role and a state of the first device, and wherein setting comprises at least one of:
      - the cluster identifier of the first device is set to be the same as the cluster identifier of the second cluster;
      - the anchor master information comprises a second AMR and a second AMBTT, wherein a value of the second AMBTT is set to be equal a value of the first AMBTT;
      - the second TSF is set to be the same as the first TSF; or
      - the role and the state of the first device are set to be the same as the role and the state of the first device in the first cluster;
  - merge to the second cluster; and
  - after merging to the second cluster, send a sync beacon message in the second cluster when the first device in the first cluster is in a sync state.

10. The first device according to claim 9, wherein the anchor master information comprises a second HC, and wherein a value of the second HC is set to be equal a value of the first HC plus one.

11. The first device according to claim 9, wherein to receive a message the processor executes the instructions to:
- receive a message from a second device that is in the second cluster, wherein the message comprises the first cluster information of the second cluster; or
- receive a message from a third device that is in the first cluster, wherein the third device is in a first NAN data cluster (NDC) of the first cluster, and the message comprises the first cluster information of the second cluster; or
- receive a message from a fourth device that is in the first cluster, wherein the message comprises the first cluster information of the second cluster.

12. The first device according to claim 9, wherein the processor executes the instructions to:
- when the first device receives the message from a second device, obtain an MR of the second device;
- when the first device receives the message from a third device, obtain an MR of the third device; and
- when the first device receives the message from a fourth device, obtain an MR of the fourth device.

13. The first device according to claim 9, further comprising wherein the processor executes the instructions to not send the sync beacon message in the second cluster when a role of the first device in the first cluster is a non-master device and a state of the first device in the first cluster is a non-sync state.

14. The first device according to claim 9, wherein when merging to the second cluster, a role and a state of the first device are the same as the role and the state of the first device in the first cluster.

15. The first device according to claim 9, wherein the cluster identifier of the second cluster is different from the cluster identifier of the first cluster and a cluster grade (CG) value of the second cluster is greater than a CG value of the first cluster.

16. A non-transitory computer-readable medium storing computer instructions that, when executed by a processor, cause the processor to:
- receive, by a first device that is a NAN device and that is in a first cluster, a message, wherein the message comprises first cluster information of a second cluster, wherein the first cluster information of the second cluster comprises at least one of a cluster identifier of the second cluster, a first anchor master rank (AMR), a first anchor master beacon transmission time (AMBTT), a first time synchronization function (TSF), or a first hop count HC;

set information of the first device according to the first cluster information of the second cluster, wherein the setting comprises;
    setting, by the first device, at least one of a cluster identifier of the first device, anchor master information, a second TSF, or a role and a state of the first device, and wherein setting comprises at least one of:
    the cluster identifier of the first device is set to be the same as the cluster identifier of the second cluster;
    the anchor master information comprises a second AMR and a second AMBTT, wherein a value of the second AMBTT is set to be equal a value of the first AMBTT;
    the second TSF is set to be the same as the first TSF; or
    the role and the state of the first device are set to be the same as the role and the state of the first device in the first cluster;
merge, by the first device, to the second cluster; and
after merging to the second cluster, send, by the first device, a sync beacon message in the second cluster when the first device in the first cluster is in a sync state.

17. The non-transitory computer-readable medium storing computer instructions of claim 16, wherein
the anchor master information comprises a second HC, and wherein a value of the second HC is set to be equal a value of the first HC plus one.

18. The non-transitory computer-readable medium storing computer instructions of claim 16, wherein to receive a message the processor executes the instructions to:
    receive a message from a second device that is in the second cluster, wherein the message comprises the first cluster information of the second cluster; or
    receive a message from a third device that is in the first cluster, wherein the third device is in a first NAN data cluster (NDC) of the first cluster, and the message comprises the first cluster information of the second cluster; or
    receive a message from a fourth device that is in the first cluster, wherein the message comprises the first cluster information of the second cluster.

19. The non-transitory computer-readable medium storing computer instructions of claim 16, wherein the processor executes the instructions to:
    when the first device receives the message from a second device, obtain an MR of the second device;
    when the first device receives the message from a third device, obtain an MR of the third device; and
    when the first device receives the message from a fourth device, obtain an MR of the fourth device.

20. The non-transitory computer-readable medium storing computer instructions of claim 16, wherein the processor executes the instructions to not send the sync beacon message in the second cluster when a role of the first device in the first cluster is a non-master device and a state of the first device in the first cluster is a non-sync state.

* * * * *